United States Patent
Ryu et al.

(10) Patent No.: US 12,047,794 B2
(45) Date of Patent: **\*Jul. 23, 2024**

(54) TECHNIQUES FOR BI-DIRECTIONAL SIDELINK BEAM FAILURE DETECTION

(71) Applicant: QUALCOMM Incorporated, San Diego, CA (US)

(72) Inventors: Jung Ho Ryu, Fort Lee, NJ (US); Sony Akkarakaran, Poway, CA (US); Jelena Damnjanovic, Del Mar, CA (US); Xiaoxia Zhang, San Diego, CA (US); Tao Luo, San Diego, CA (US); Junyi Li, Fairless Hills, PA (US); Ling Ding, Chester, NJ (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 17/349,644

(22) Filed: Jun. 16, 2021

(65) Prior Publication Data

US 2022/0022068 A1  Jan. 20, 2022

Related U.S. Application Data

(60) Provisional application No. 63/053,083, filed on Jul. 17, 2020.

(51) Int. Cl.
*H04W 24/08* (2009.01)
*H04L 5/00* (2006.01)

(52) U.S. Cl.
CPC .......... *H04W 24/08* (2013.01); *H04L 5/0048* (2013.01)

(58) Field of Classification Search
CPC .... H04W 24/08; H04W 76/14; H04L 5/0048; H04B 7/088; H04B 7/0695
See application file for complete search history.

(56) References Cited

U.S. PATENT DOCUMENTS

2020/0229007 A1    7/2020  Jung et al.
2020/0267025 A1*   8/2020  Yu ........................ H04L 5/0051
(Continued)

FOREIGN PATENT DOCUMENTS

| EP | 3726740 A1 | 10/2020 |
| WO | WO-2019174532 A1 | 9/2019 |
| WO | WO-2020109997 A1 | 6/2020 |

OTHER PUBLICATIONS

Interdigital Inc: "RLM/RLF for NR V2X", 3GPP Draft, R2-1914871, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Nov. 8, 2019 (Nov. 8, 2019), pp. 1-4, XP051816815, Retrieved from the Internet: URL: https://ftp.3gpp.org/tsg_ran/WG2_RL2/TSGR2_108/Docs/R2-1914871.zip, R2-1914871 (R16-V2X WI A645 RLM RLF).doc [retrieved on Nov. 8, 2019], The whole document.

(Continued)

*Primary Examiner* — Justin T Van Roie
(74) *Attorney, Agent, or Firm* — Dalei Dong; Holland & Hart LLP

(57) ABSTRACT

Methods, systems, and devices for wireless communications are described. For example, the described techniques provide for configuring sidelink beam failure detection reference signals for determining beam failures on a sidelink between a first sidelink user equipment (UE) and a second sidelink UE. The first UE may determine a first set of sidelink beam failure detection reference signals to transmit to the second UE and a second set of sidelink beam failure
(Continued)

detection reference signals to receive from the second UE. The first UE may transmit the first set to the second UE using a set of sidelink transmit beams. The first UE may further monitor for the determined second set using a set of sidelink receive beams. Based on the first and second set of sidelink beam failure detection reference signals, the first and second UE may communicate over the sidelink.

22 Claims, 14 Drawing Sheets

(56) References Cited

U.S. PATENT DOCUMENTS

| | | | |
|---|---|---|---|
| 2022/0007448 A1* | 1/2022 | Ryu | H04W 76/19 |
| 2022/0174774 A1* | 6/2022 | Tseng | H04W 76/34 |

OTHER PUBLICATIONS

International Search Report and Written Opinion—PCT/US2021/037761—ISA/EPO—Oct. 11, 2021.
Motorola Mobility., et al., "RLM and RLF Recovery Handling", 3GPP Draft, R1-1912326, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), 4 Pages, XP051820000, Retrieved from the Internet: URL: https://ftp.3gpp.org/tsg_ran/WG1_RL1/TSGR1_99/Docs/R1-1912326.zip, R1-1912326.docx, [retrieved on Nov. 8, 2019] The whole document.

\* cited by examiner

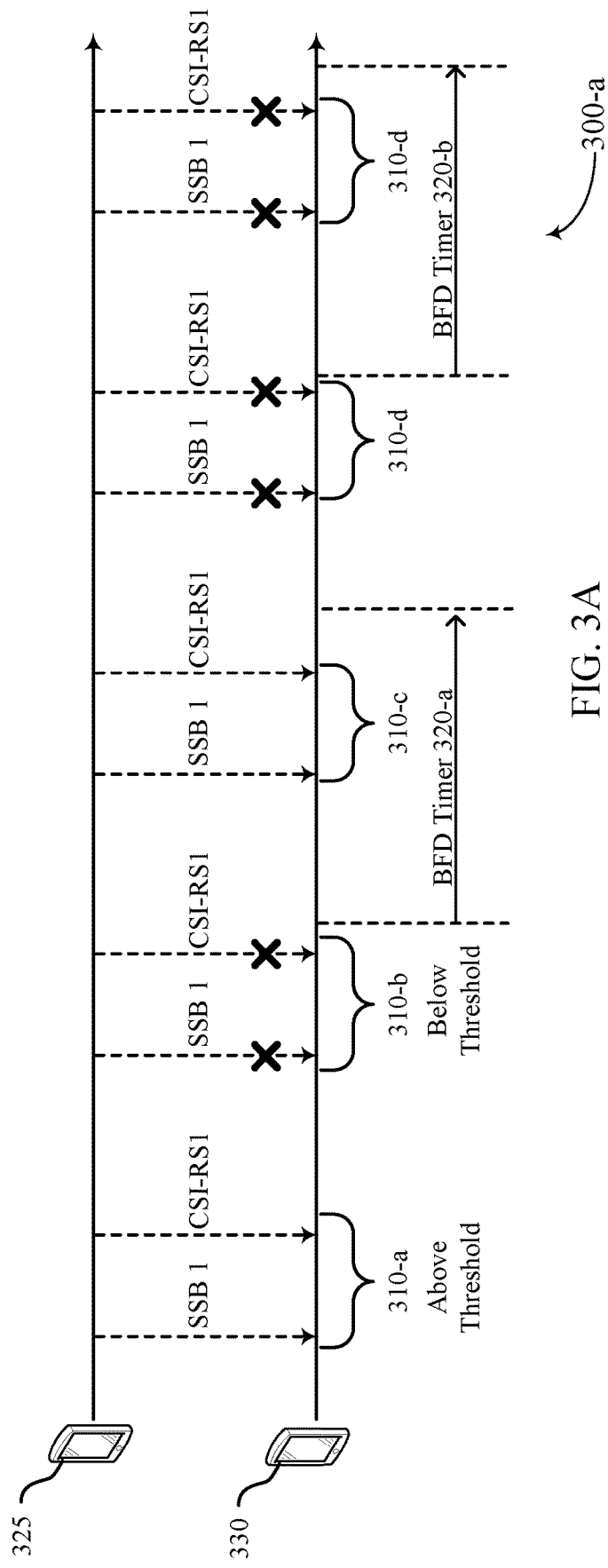
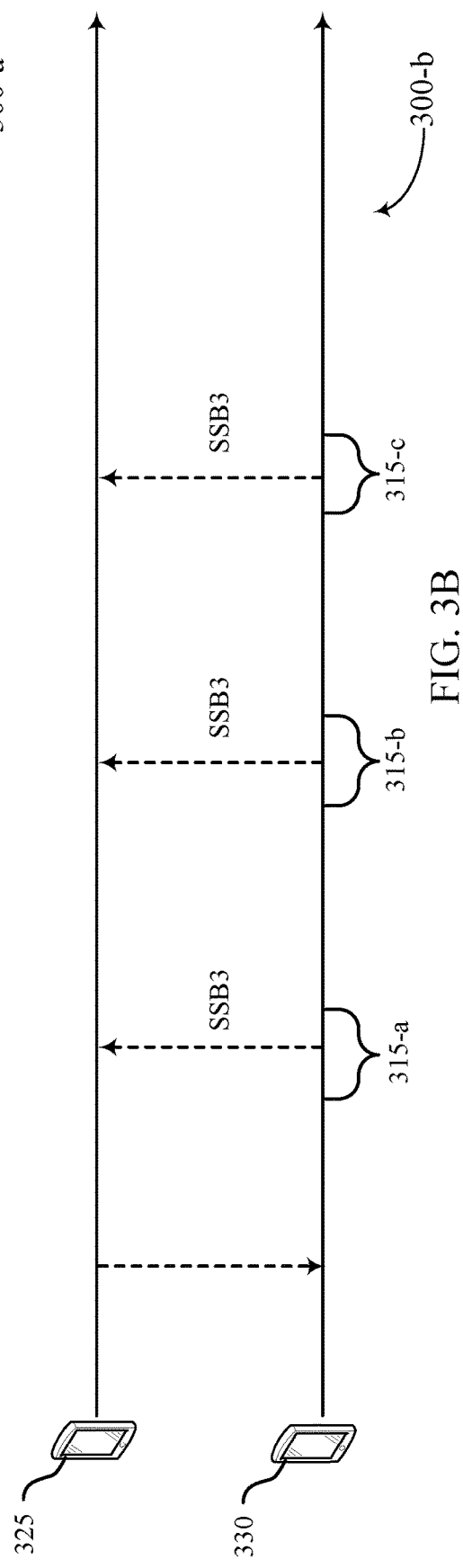
FIG. 3A
FIG. 3B

TECHNIQUES FOR BI-DIRECTIONAL SIDELINK BEAM FAILURE DETECTION

CROSS REFERENCE

The present Application for Patent claims the benefit of U.S. Provisional Patent Application No. 63/053,083 by Ryu et al., entitled "TECHNIQUES FOR BI-DIRECTIONAL SIDELINK BEAM FAILURE DETECTION," filed Jul. 17, 2020, assigned to the assignee hereof, and which is hereby incorporated by reference in its entirety.

FIELD OF DISCLOSURE

The following relates to wireless communications, including techniques for bi-directional sidelink beam failure detection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE and a base station may communicate via beamforming to increase communication reliability and efficiency, among other benefits. In some cases, beamformed communications may fail due to blocking, movement, or other cause. The base station and the UE may identify a new beam to use for communications when a beam fails.

SUMMARY

The described techniques relate to improved methods, systems, devices, and apparatuses that support techniques for bi-directional sidelink beam failure detection. For example, the described techniques provide for configuring sidelink beam failure detection reference signals for determining beam failures on a sidelink between a first sidelink user equipment (UE) and a second sidelink UE. The first UE may determine a first set of sidelink beam failure detection reference signals to transmit to the second UE, and the first UE may determine a second set of sidelink beam failure detection reference signals to receive from the second UE. The first UE may transmit the first set of sidelink beam failure detection reference signals to the second UE using a set of sidelink transmit beams. The first UE may also monitor for the determined second set of sidelink beam failure detection reference signals using a set of sidelink receive beams. Based on the first and second set of sidelink beam failure detection reference signals, the first and second UE may communicate over the sidelink.

A method of wireless communications at a first UE is described. The method may include transmitting, to a second UE, a first set of sidelink beam failure detection reference signals using a set of sidelink transmit beams, monitoring for a second set of sidelink beam failure detection reference signals using a set of sidelink receive beams, and communicating with the second UE on a sidelink based on the first set of sidelink beam failure detection reference signals and the second set of sidelink beam failure detection reference signals.

An apparatus for wireless communications at a first UE is described. The apparatus may include a processor, memory coupled with the processor, and instructions stored in the memory. The instructions may be executable by the processor to cause the apparatus to transmit, to a second UE, a first set of sidelink beam failure detection reference signals using a set of sidelink transmit beams, monitor for a second set of sidelink beam failure detection reference signals using a set of sidelink receive beams, and communicate with the second UE on a sidelink based on the first set of sidelink beam failure detection reference signals and the second set of sidelink beam failure detection reference signals.

Another apparatus for wireless communications at a first UE is described. The apparatus may include means for transmitting, to a second UE, a first set of sidelink beam failure detection reference signals using a set of sidelink transmit beams, monitoring for a second set of sidelink beam failure detection reference signals using a set of sidelink receive beams, and communicating with the second UE on a sidelink based on the first set of sidelink beam failure detection reference signals and the second set of sidelink beam failure detection reference signals.

A non-transitory computer-readable medium storing code for wireless communications at a first UE is described. The code may include instructions executable by a processor to transmit, to a second UE, a first set of sidelink beam failure detection reference signals using a set of sidelink transmit beams, monitor for a second set of sidelink beam failure detection reference signals using a set of sidelink receive beams, and communicate with the second UE on a sidelink based on the first set of sidelink beam failure detection reference signals and the second set of sidelink beam failure detection reference signals.

Some examples of the method, apparatuses, and non-transitory computer-readable medium described herein may further include operations, features, means, or instructions for receiving, from the second UE, a control message that configures the first set of sidelink beam failure detection reference signals, the second set of sidelink beam failure detection reference signals or both the first set of sidelink beam failure detection reference signals and the second set of sidelink beam failure detection reference signals.

Some examples of the method, apparatuses, and non-transitory computer-readable medium described herein may further include operations, features, means, or instructions for transmitting, to the second UE, a first control message that configures the second set of sidelink beam failure detection reference signals that the second UE may be to transmit to the first UE, the first set of sidelink beam failure detection reference signals that the second UE may be to receive from the first UE, or both the second set of sidelink beam failure detection reference signals and the first set of sidelink beam failure detection reference signals.

Some examples of the method, apparatuses, and non-transitory computer-readable medium described herein may further include operations, features, means, or instructions for receiving, from a base station, a second control message that configures the first set of sidelink beam failure detection reference signals, the second set of sidelink beam failure detection reference signals, or both the second set of sidelink beam failure detection reference signals and the first set of sidelink beam failure detection reference signals, where the first control message may be transmitted to the second UE based on receiving the second control message from the base station.

Some examples of the method, apparatuses, and non-transitory computer-readable medium described herein may further include operations, features, means, or instructions for receiving, from a base station, a control message that configures the first set of sidelink beam failure detection reference signals, the second set of sidelink beam failure detection reference signals, or both the first set of sidelink beam failure detection reference signals and the second set of sidelink beam failure detection reference signals.

Some examples of the method, apparatuses, and non-transitory computer-readable medium described herein may further include operations, features, means, or instructions for receiving, from the second UE, a control message that indicates a counter threshold value for a beam failure indication counter, an expiration timer value for a beam failure indication timer, or both the counter threshold value for the beam failure indication timer and the expiration timer value for the beam failure indication timer.

Some examples of the method, apparatuses, and non-transitory computer-readable medium described herein may further include operations, features, means, or instructions for transmitting, to the second UE, a control message that indicates a counter threshold value for a beam failure indication counter, an expiration timer value for a beam failure indication timer, or both the counter threshold value for the beam failure indication timer and the expiration timer value for the beam failure indication timer.

Some examples of the method, apparatuses, and non-transitory computer-readable medium described herein may further include operations, features, means, or instructions for receiving, from a base station, a control message that indicates a counter threshold value for a beam failure indication counter, an expiration timer value for a beam failure indication timer, or both the counter threshold value for the beam failure indication timer and the expiration timer value for the beam failure indication timer.

Some examples of the method, apparatuses, and non-transitory computer-readable medium described herein may further include operations, features, means, or instructions for detecting a beam failure based on the monitoring for receipt of the second set of sidelink beam failure detection reference signals, and performing a beam failure recovery procedure with the second UE based on detecting the beam failure.

Some examples of the method, apparatuses, and non-transitory computer-readable medium described herein may further include operations, features, means, or instructions for refraining from transmitting one or more of the first set of sidelink beam failure detection reference signals based on detecting the beam failure, where the beam failure recovery procedure may be performed with the second UE based on the refraining from transmitting the one or more of first set of sidelink beam failure detection reference signals.

Some examples of the method, apparatuses, and non-transitory computer-readable medium described herein may further include operations, features, means, or instructions for transmitting, to the second UE, a base station, or both the second UE and the base station, an indication of the beam failure, where the beam failure recovery procedure may be performed based on transmitting the indication.

Some examples of the method, apparatuses, and non-transitory computer-readable medium described herein may further include operations, features, means, or instructions for determining that a reference signal received power of one or more of the second set of sidelink beam failure detection reference signals may be below a received power threshold, initiating a beam failure timer based on determining that the reference signal received power may be below the received power threshold, and incrementing a beam failure counter for each occurrence of the second set of sidelink beam failure detection reference signals being received with the reference signal received power below the received power threshold before expiration of the beam failure timer, where the beam failure may be detected based on the beam failure counter reaching a counter threshold.

Some examples of the method, apparatuses, and non-transitory computer-readable medium described herein may further include operations, features, means, or instructions for receiving, from the second UE or a base station, an indication of a beam failure associated with the second UE, and performing a beam failure recovery procedure with the second UE based on receiving the indication.

Some examples of the method, apparatuses, and non-transitory computer-readable medium described herein may further include operations, features, means, or instructions for incrementing a beam failure counter based on receiving the indication of the beam failure, where the beam failure recovery procedure may be performed based on the beam failure counter reaching a counter threshold.

Some examples of the method, apparatuses, and non-transitory computer-readable medium described herein may further include operations, features, means, or instructions for adjusting one or more sidelink receive beams for receiving the second set of sidelink beam failure detection reference signals.

Some examples of the method, apparatuses, and non-transitory computer-readable medium described herein may further include operations, features, means, or instructions for transmitting, to the second UE, an indication of adjustments to the one or more sidelink receive beams.

Some examples of the method, apparatuses, and non-transitory computer-readable medium described herein may further include operations, features, means, or instructions for receiving, from the second UE, an indication of adjustments to one or more sidelink receive beams used by the second UE to receive the first set of sidelink beam failure detection reference signals.

In some examples of the method, apparatuses, and non-transitory computer-readable medium described herein, the first set of sidelink beam failure detection reference signals, the second set of sidelink beam failure detection reference signals, or both the first set of sidelink beam failure detection reference signals and the second set of sidelink beam failure detection reference signals include a sidelink synchronization signal block or a sidelink channel state information reference signal.

In some examples of the method, apparatuses, and non-transitory computer-readable medium described herein, a first periodicity associated with transmitting the first set of sidelink beam failure detection reference signals may be different from a second periodicity for monitoring for receipt of the second set of sidelink beam failure detection reference signals.

A method of wireless communications at a base station is described. The method may include transmitting, to a first UE, a control message that indicates a first set of sidelink beam failure detection reference signals to transmit to a second UE, a second set of sidelink beam failure detection reference signals to receive from the second UE, or both the first set of sidelink beam failure detection reference signals and the second set of sidelink beam failure detection reference signals and communicating with the first UE or the second UE based on transmitting the control message.

An apparatus for wireless communications at a base station is described. The apparatus may include a processor, memory coupled with the processor, and instructions stored in the memory. The instructions may be executable by the processor to cause the apparatus to transmit, to a first UE, a control message that indicates a first set of sidelink beam failure detection reference signals to transmit to a second UE, a second set of sidelink beam failure detection reference signals to receive from the second UE, or both the first set of sidelink beam failure detection reference signals and the second set of sidelink beam failure detection reference signals and communicate with the first UE or the second UE based on transmitting the control message.

Another apparatus for wireless communications at a base station is described. The apparatus may include means for transmitting, to a first UE, a control message that indicates a first set of sidelink beam failure detection reference signals to transmit to a second UE, a second set of sidelink beam failure detection reference signals to receive from the second UE, or both the first set of sidelink beam failure detection reference signals and the second set of sidelink beam failure detection reference signals and communicating with the first UE or the second UE based on transmitting the control message.

A non-transitory computer-readable medium storing code for wireless communications at a base station is described. The code may include instructions executable by a processor to transmit, to a first UE, a control message that indicates a first set of sidelink beam failure detection reference signals to transmit to a second UE, a second set of sidelink beam failure detection reference signals to receive from the second UE, or both the first set of sidelink beam failure detection reference signals and the second set of sidelink beam failure detection reference signals and communicate with the first UE or the second UE based on transmitting the control message.

In some examples of the method, apparatuses, and non-transitory computer-readable medium described herein, transmitting the control message may include operations, features, means, or instructions for transmitting to the first UE, an indication that the first UE may be to convey the first set of sidelink beam failure detection reference signals, the second set of sidelink beam failure detection reference signals, or both the first set of sidelink beam failure detection reference signals and the second set of sidelink beam failure detection reference signals to the second UE.

In some examples of the method, apparatuses, and non-transitory computer-readable medium described herein, transmitting the control message may include operations, features, means, or instructions for transmitting, to the first UE, the control message that indicates a counter threshold value for a beam failure indication counter, an expiration timer value for a beam failure indication timer, or both the counter threshold value for the beam failure indication timer and the expiration timer value for the beam failure indication timer.

Some examples of the method, apparatuses, and non-transitory computer-readable medium described herein may further include operations, features, means, or instructions for receiving, from the first UE, an indication of a beam failure associated with a sidelink between the first UE and the second UE, and transmitting, to the second UE, the indication of the beam failure.

BRIEF DESCRIPTION OF THE DRAWINGS

FIG. 3A and FIG. 3B illustrate examples of communication timelines that support techniques for bi-directional sidelink beam failure detection in accordance with various aspects of the present disclosure.

DETAILED DESCRIPTION

Figure 1:
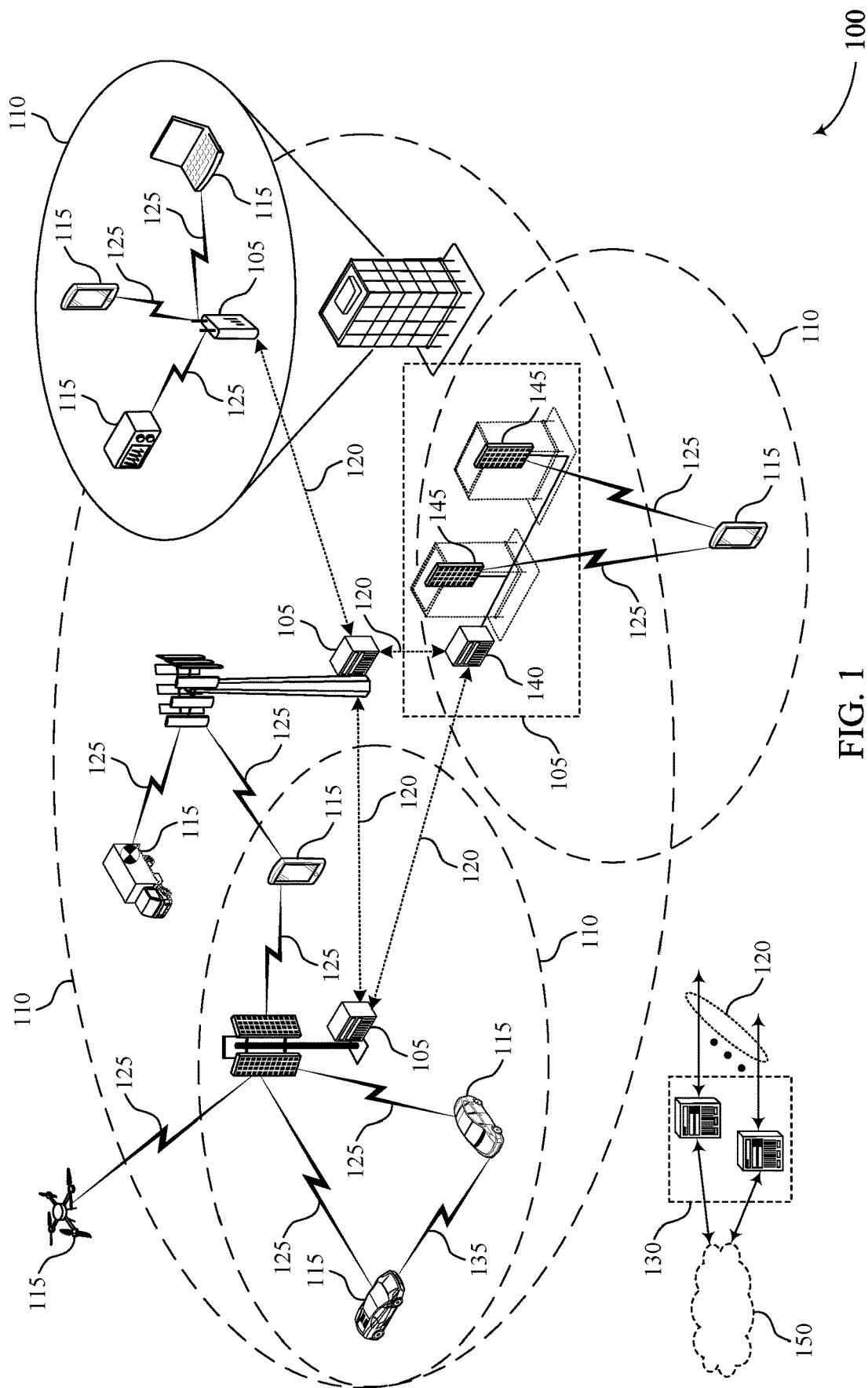
FIG. 1 illustrates an example of a wireless communications system that supports techniques for bi-directional sidelink beam failure detection in accordance with various aspects of the present disclosure.

Some wireless communications systems may support beamformed communications to increase signal reliability and efficiency, among other benefits. A user equipment (UE) and a base station may utilize beamforming for communications, and in some cases, a set of beams that is used for communications between the UE and the base station may fail or may become unusable for communications. These occurrences may be due to blocking by a physical object, movement by the UE or the base station, or some other cause. In such cases, one or both devices may detect that beam failure has occurred and identify a new set of beams for communications.

Wireless communications systems may also support communications between UEs or other nodes in the network. In such cases, the devices (e.g., UEs) may establish a sidelink for communications. Further, the devices may communicate over sidelink using beamforming. When UEs 115 utilize beamforming over a sidelink, a first UE may utilize different transmit and receive beams for communications with a second UE. More specifically, a first beam used by the first UE to transmit to the second UE may be different from a second beam that is used by the first UE to receive from the second UE. This scenario may occur due to a maximum permissible emission (MPE) problem (e.g., a transmit beam that is pointed to a user's head may not be used). For example, a receive beam may point at the user's head, but the same beam may not be used to transmit. As described above with respect to the access link (e.g., base station to UE communication), the sidelink beams may fail due to various issues. In cases when the transmit and receive beam are different, monitoring by only one of the devices, as is performed in an access link, may not be useful for identifying when a beam fails. Implementations described herein provide for techniques to identify sidelink beam failure.

For example, a first sidelink UE may be configured with a first set of sidelink beam failure detection reference signals (BFD-RS) that may be transmitted to a second UE over the sidelink. Further, the first sidelink UE may be configured with a second set of sidelink BFD-RSs that the first UE is to receive from the second UE. The second UE may be similarly configured with the first set of sidelink BFD-RSs (to receive from the first UE) and the second set of BFD-RSs (to transmit to the first UE). Each UE may monitor the reference signal received power (RSRP) of the respective reference signals and identify a beam failure condition based on the RSRPs. For example, if one or more received BFD-RSs are below a threshold, then one of the UEs may initiate a beam failure recovery procedure to identify new beams for communication. The UEs may be configured with the respective BFD-RSs based on a pre-configuration, a control message received from the base station, or a control message received from another sidelink UE. That is, a UE of a sidelink may configure the other sidelink UE with the BFD-RSs to transmit and/or receive (e.g., monitor).

Aspects of the subject matter described herein may be implemented to realize one or more advantages. The described techniques may support improvements in the sidelink beamforming framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further described with respect to a wireless communications system, a communication timeline, and a process flow diagram. Aspects of the disclosure are further illustrated by and described with reference to apparatus diagrams, system diagrams, and flowcharts that relate to techniques for bi-directional sidelink beam failure detection.

FIG. 1 illustrates an example of a wireless communications system 100 that supports techniques for bi-directional sidelink beam failure detection in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency spectrum band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency spectrum bands, for example in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described, the wireless communications system may support beamformed communications between base stations 105 and UEs 115. A base station 105 and a UE 115 may communicate using beams on an access link. In some cases, the beams used to communicate on the access link may fail due to blocking, movement by the base station 105 and/or the UE 115, or some other condition. One or both of the devices may detect a beam failure and identify a new set of beams to use for communications. For example, the base station 105 may periodically transmit a reference signal using one or more transmit beams. The UE 115 may monitor a RSRP of the reference signal and determine that a beam failure has occurred based on the RSRP. The UE 115 may report the beam failure to the base station 105 and initiate a beam recovery process.

UEs 115 may also utilize beamforming to communicate other UEs over a sidelink. In some cases, the transmit beam used by a first UE 115 to transmit to a second UE 115 over the sidelink may be different from a receive beam used by the first UE 115 to receive from the second UE 115 over the sidelink. This scenario may be due to an MPE problem, but it should be understood that this scenario may be a result of other conditions. For example, a first beam may be used by the first UE 115 to receive from the second UE 115, but the same first beam may not be used by the first UE 115 to transmit to the second UE due to the first beam being pointed towards a head of a user. In such cases, the first UE 115 may utilize a different second beam to transmit to the second UE 115. In cases where sidelink transmit and sidelink receive beams are different, monitoring for beam failure by one of the UEs 115 of the sidelink may be insufficient to identify a beam failure. That is, a beam failure may occur on one of the misaligned beams at one of the UEs 115, but since the UE 115 is not monitoring the transmit beam, the UE 115 may not detect the beam failure.

Implementations described herein provide for techniques for configuring both UEs 115 of a sidelink to transmit and receive BFD-RSs, such that beam failures may be identified by one or both UEs 115. For example, a first UE 115 of a sidelink may be configured with a first set of sidelink BFD-RSs to transmit to the second UE 115 of the sidelink, and the first UE 115 may also be configured with a second set of BFD-RSs to monitor for or receive from the second UE 115 of the sidelink. The second UE 115 may be similarly configured with both sets of BFD-RSs. Thus, since both UEs 115 are configured with the respective BFD-RSs, each UE 115 may be able to identify a beam failure. These and other implementations are further described with respect to the following figures.

Figure 2:
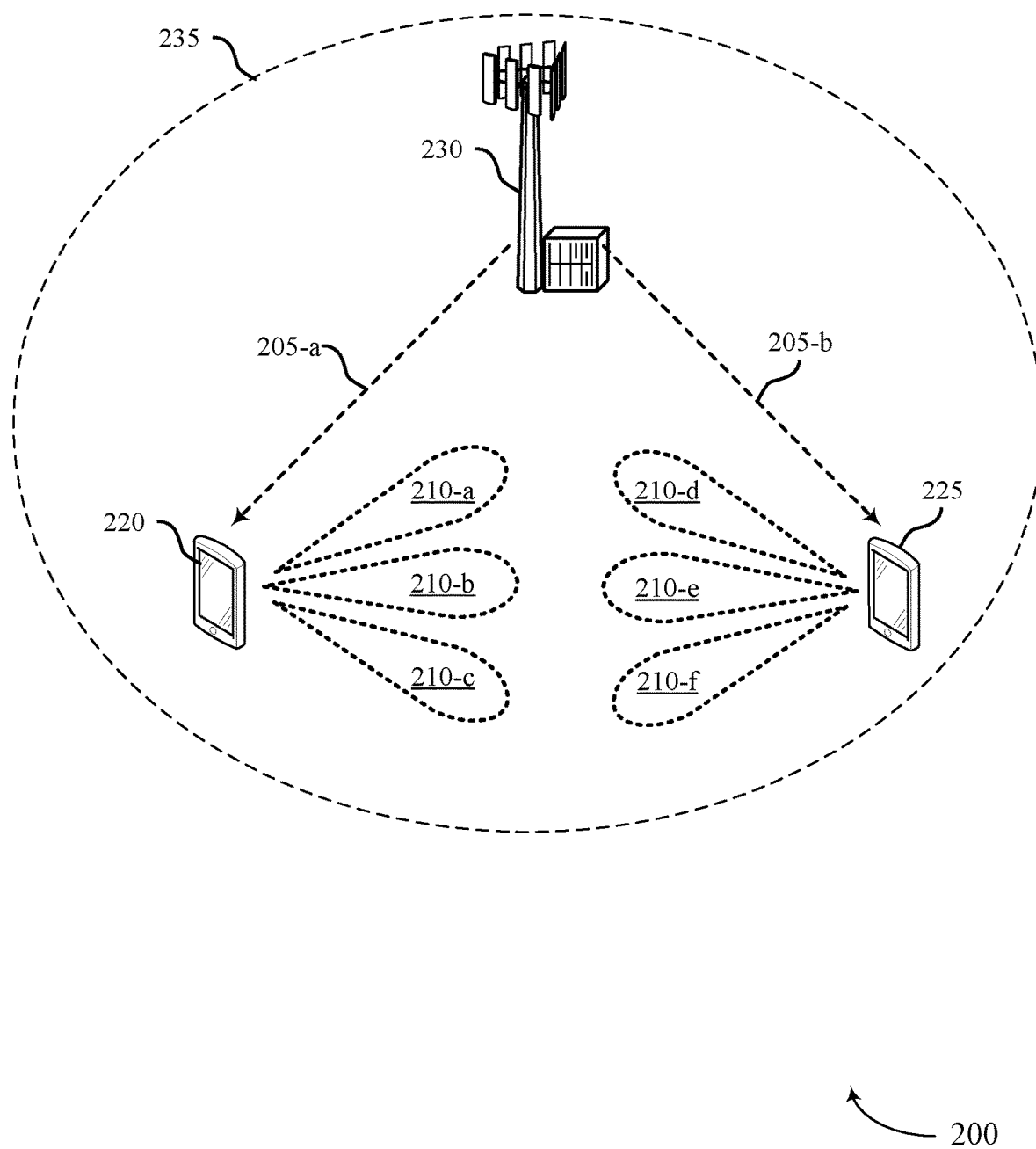
FIG. 2 illustrates an example of a wireless communications system that supports techniques for bi-directional sidelink beam failure detection in accordance with various aspects of the present disclosure.

FIG. 2 illustrates an example of a wireless communications system 200 that supports techniques for bi-directional sidelink beam failure detection in accordance with various aspects of the present disclosure. In some examples, wireless communications system 200 may implement aspects of wireless communications system 100. The wireless communications system 200 includes a base station 230, a UE 220, and a UE 225, which may be examples of the corresponding devices of FIG. 1. The base station 230 may communicate with UEs 115 within a coverage area 235. For example, the base station 230 communicates with the UE 220 and UE 225 over an access link. Further, the UE 220 and UE 225 may communicate with each other over a sidelink. It should be understood that the implementations described herein may be applicable to other devices that may communicate over a sidelink, such as integrated access and backhaul (IAB) nodes, which may be referred to as UEs (e.g., UE 115, UE 220, and UE 225).

In some examples, the base station 230 may transmit a control message 205, a downlink control information message, radio resource control (RRC) message, a medium access control-control element (MAC-CE), or the like, that configures the UE 220 and/or the UE 225 with resources to utilize for the sidelink communications. In other examples, one or both UEs may determine such resources for the sidelink without input by the base station 230. As illustrated, each UE 220 and UE 225 may utilize one or more beams 210 to communicate over the sidelink. In some examples, a same beam 210 may be used to transmit and receive on the sidelink by the UE. For example, beam 210-a may be used by the UE 220 to both transmit communications to and receive communications from the UE 225 on the sidelink. Similarly, the UE 225 may utilize a same beam 210 to both transmit and receive on the sidelink. However, in some scenarios, the transmit and receive beam used for sidelink may be different. In some cases, this may be due to MPE conditions. For example, the UE 220 may use beam 210-b to receive communications from UE 225. However, a different beam 210-c may be used to transmit because the beam 210-b is pointed towards a user's head.

According to the techniques described herein, the UE 220 and the UE 225 may be configured with a first set of BFD-RSs and a second set of BFD-RS. For examples, the UE 220 may be configured with a first set of BFD-RS to periodically or aperiodically transmit to the second UE 225, and the UE 220 may also be configured with a second set of BFD-RS to monitor for receipt of from the second UE 225. The UE 220 and the UE 225 may be configured with the sets of reference signals by the base station 230, by the other UE, or may be pre-configured with the sets of reference signals. In one example, the control message 205-a that is transmitted to the UE 220 may include an indication of one or both of the first set of BFD-RS and the second set of BFD-RS. The base station 230 may also send the control message 205-b to the UE 225, and the control message 205-b may include the indication of one or both of the first set of BFD-RSs and the second set of BFD-RSs. However, in some examples, the UE 220 may relay an indication of one or both of the first set of BFD-RSs and the second set of BFD-RSs to the second UE 225. That is, upon receiving the configuration via the control message 205-a, the first UE 220 may relay the configuration to the second UE 225 (e.g., using a sidelink control information (SCI) message, RRC message, or the like). This scenario may occur, for example, when one of the UEs 115 is positioned outside the coverage area 110 of the base station. In other examples, the UE 220 or the UE 225 may identify a configuration for one or both of the first set of BFD-RSs and the second set of BFD-RSs and transmit the configuration (e.g., using SCI or RRC) to the other UE.

As such, each of UE 220 and UE 226 may be configured with parameters, such as slTxRadioLinkMonitoringRS and slRxRadioLinkMonitoringRS that may be used for beam failure detection. For example, slTxRadioLinkMonitoringRS may indicate a list of BFD-RSs to transmit and the corresponding transmit beams, and slRxRadioLinkMonitoringRS may indicate a list of BFD-RSs to receive and the corresponding receive beams. Each of UE 220 and UE 225 may be configured with a beam failure indication (BFI) counter to tally a number of times that each BFD-RS are received below a threshold. For example, each time the second set of BFD-RSs are received by the UE 220 and from the UE 225 with a RSRP below a RSRP threshold, the UE 220 may increment a counter. If the BFI counter reaches a maximum or threshold count before expiration of a timer, then the UE 220 may determine that a beam failure has occurred and trigger a beam failure recovery procedure. As discussed with respect to the sets of BFD-RS, the UE 220 and the UE 225 may be configured with the counter threshold and timer by the base station 230, by the other UE of the sidelink, and/or based on a pre-configuration.

The BFD-RSs may be examples of sidelink synchronization signal blocks (SSBs), sidelink channel state information reference signals (CSI-RSs), or a combination of both. For example, the sidelink SSBs may include a set of synchronization signals (e.g., primary synchronization signals (PSSs) and secondary synchronization signals (PSSs)) that may be used as BFD-RSs. Further, each UE 220 and UE 225 may be configured with different sets or combinations of different reference signals. For example, UE 220 may be configured to transmit a SL SSB and a CSI-RS as the first set of BFD-RSs, and the UE 220 may be configured to transmit repetitions of the SL SSB as the second set of BFD-RSs. Further, the UE 220 and the UE 225 are configured to monitor the BFD-RS transmitted by the other UE. For example, UE 225 is configured to monitor the sidelink SSB and/or the sidelink CSI-RS transmitted by the UE 220 for beam failure detection. That is, the parameter slRxRadioLinkMonitoringRS for UE 225 may include an indication of the SL SSB and/or the sidelink CSI-RS that the UE 220 is to transmit.

FIG. 3A and FIG. 3B illustrate examples of communication timelines 300 that support techniques for bi-directional sidelink beam failure detection in accordance with various aspects of the present disclosure. In some examples, communication timeline 300 may implement aspects of wireless communications system 100. The communication timelines 300 include UE 325 and UE 330, which may be examples of the UEs as described with respect to FIGS. 1 and 2.

FIG. 3A illustrates timeline 300-a with a set of occasions 310 in which UE 325 transmits BFD-RSs to UE 330, and FIG. 3B illustrates timeline 300-b with a set of occasions 315 in which UE 330 transmits BFD-RS to UE 325. It should be understood that the set of occasions 310 and the set of occasions 315 may be interleaved with one another, positioned sequentially, or in some other format. That is, the UE 325 may transmit one or more BFD-RSs during a first occasion 310-a, and then UE 330 may transmit one or more BFD-RS during a second occasion 315-a subsequent to the first occasion 310-a. Other timeline configurations of BFD-RS transmission occasions are contemplated within the scope of this disclosure.

The UE 325 and the UE 330 may be configured with a set of BFD-RS according to aspects of the disclosure described herein. For example, a base station (e.g., a base station 105 as shown in FIG. 1) may configure both the UE 325 and the UE 330 with a first set of BFD-RSs and a second set of BFD-RSs, where the first set corresponds to transmission by the UE 325 and receipt by the UE 330 and the second set corresponds to transmission by the UE 330 and receipt by the UE 325. In another example, the UE 325 may receive the control message that indicates the first set of BFD-RS and the second set of BFD-RS and transmit a control message to the UE 330 with an indication of the first set, the second set, or both that were indicated by the base station. In yet another example, the UE 330 may identify the first set of BFD-RS and the second set of BFD-RS and transmit a control message to the UE 325 with an indication of the first set, the second set, or both.

As illustrated, UE 325 is configured to transmit a set of BFD-RSs that include an SSB and a CSI-RS. As such, during each occasion 310, the UE 325 transmits an SSB and a CSI-RS using one or more beams. Further, the UE 330 is configured to monitor for receipt of the SSB and the CSI-RS during each occasion 310 and using one or more beams. The UE 325 and the UE 330 may also be configured with a RSRP threshold, a beam failure detection counter, a beam failure detection counter threshold, and a beam failure detection timer. According some implementations, when a UE detects the RSRPs of BFD-RSs of a set below the threshold, then the UE may initiate a timer. If the UE detects BFD-RSs of the set below the threshold before expiration of the timer, then the UE may increment the counter. If the counter reaches a counter threshold, then the UE 115 may determine that a beam failure has occurred and initiate a beam failure recover procedure.

In FIG. 3A, the UE 325 transmits the first set of BFD-RSs (e.g., SSB and CSI-RS) during the first occasion 310-a and on one or more transmit beams. The UE 330 receives the set of BFD-RSs using one or more receive beams and determines that the RSRPs are above the threshold. During occasion 310-b, the UE 330 determines that the first set of BFD RSs are received with RSRPs below the threshold. In response, the UE 330 initiates BFD timer 320-a. Before expiration of the timer, the UE 330 receives the first set of BFD-RSs during the occasion 310-c. Since these BFD-RSs are received with RSRPs above the threshold, the UE 330 does not increment the counter. The BFD timer 320-a expires (e.g., the timer reaches the expiration timer value) before the counter reaches the counter threshold (e.g., counter threshold value). As such, the UE 330 may not determine that a beam failure has occurred, and the UE 330 may reset the counter. At occasion 310-d, the UE 330 receives the first set of BFD-RSs with RSRPs below the threshold. In response, the UE 330 initiates the BFD timer 320-b. Before expiration of the BFD timer 320-b, the UE 330 receives the first set of BFD-RSs with RSRPs below the threshold at occasion 310-d. In response, the UE 330 increments the counter. In this example, the counter reaches the counter threshold before expiration of the BFD timer 320-b. Thus, the UE 330 may determine that a beam failure has occurred. In response, the UE 330 may initiate a beam failure recovery procedure. During occasion 315-a, occasion 315-b, and occasion 315-*c*, the UE 325 receives the second set of BFD-RSs above the threshold. As such, the UE 325 may not initiate a beam failure recovery procedure. Accordingly, the UE 330 may determine a beam failure during the same period that the UE 325 receives reference signals with RSRPs above the threshold. As described herein, this scenario may be due to the respective beams being misaligned due to MPE conditions.

In FIG. 3B, the UE 330 transmits the second set of BFD-RSs during occasion 310-*b*, and the UE 325 monitors for receipt of the second set of BFD-RS. As illustrated, the second set of BFD-RSs may include SSBs. It should be understood that other configurations of BFD-RSs are contemplated within the scope of the present disclosure. The UE 325 receives the second set of BFD-RSs during the occasion 315-*a*, occasion 315-*b*, and the occasion 315-*c* with RSRPs above the threshold. As such, the UE 325 may not determine that a beam failure has occurred.

In some cases, the UEs may exchange notifications when a beam failure is determined. For example, when UE 330 determines that a beam failure has occurred after occasion 310-*d*, then the UE 330 may transmit an indication of the beam failure to the UE 325. The indication may be transmitted via SCI, RRC signaling, or using another type of signaling. In such cases, the indication of the beam failure may be counted towards a counter maintained by the UE 325. More specifically, if the UE 325 has initiated a counter due to receipt of the second set of BFD-RSs below a threshold and the UE 325 receives the indication of the beam failure from the UE 330, then the UE 325 may increment the counter. As such, the UEs 115 may work in conjunction to identify beam failures.

In some examples, when a UE 115, such as UE 330 determines that a beam failure occurs due to receipt of BFD-RSs below a threshold, then the UE 330 may refrain from transmitting subsequent reference signals such as to trigger the other UE 115 of the sidelink to determine that a beam failure has occurred. As such, both UEs 115 may initiate a beam failure recovery procedure. For example, when UE 330 determines that beam failure has occurred after occasion 310-*d*, the UE 330 may refrain from subsequent BFD-RS (e.g., second set of BFD-RSs). Accordingly, since the UE 325 may be configured to monitor for the reference signals and does not receive the reference signals, then the UE 325 may also identify that a beam failure has occurred.

Figure 4:
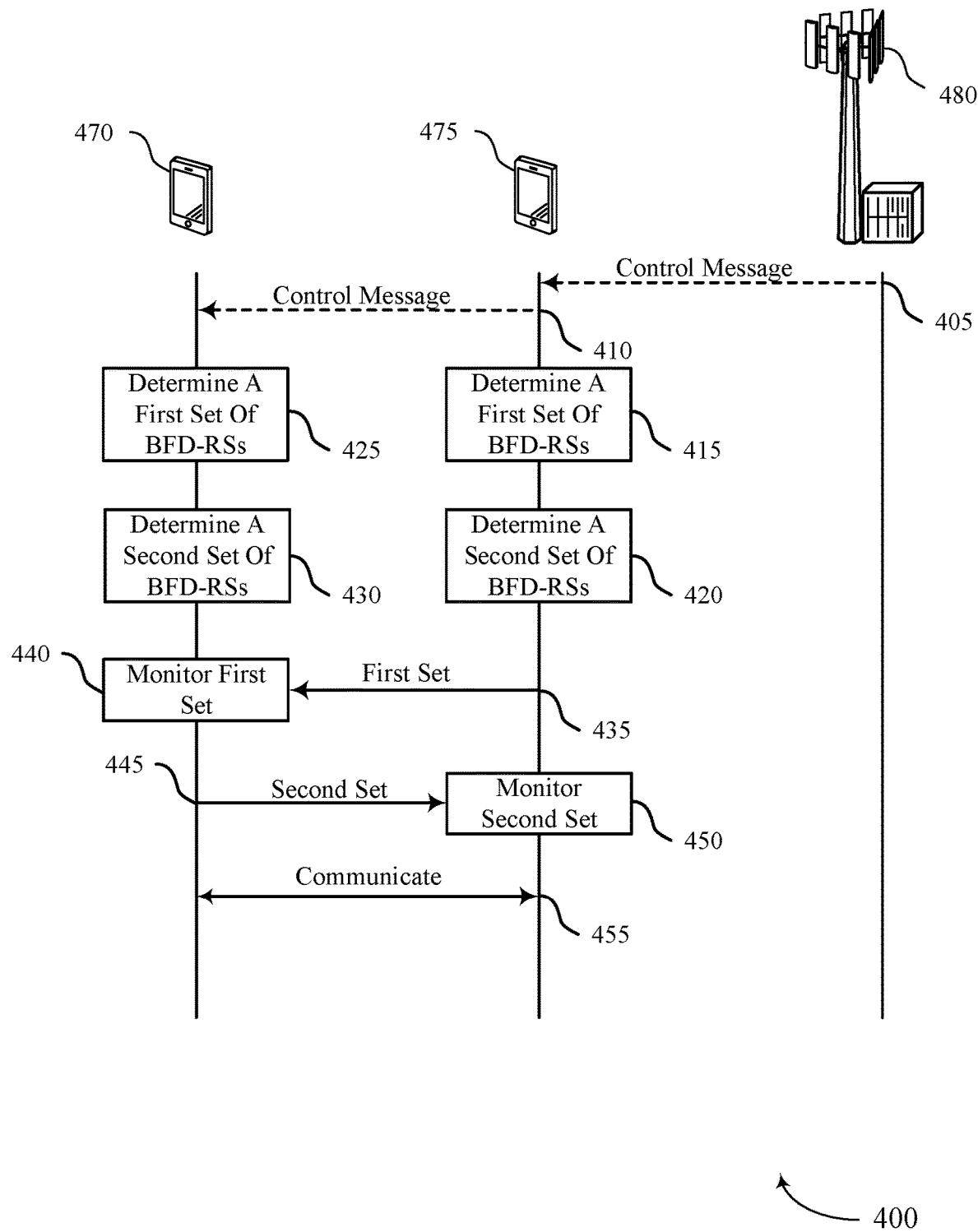
FIG. 4 illustrates an example of a process flow diagram that supports techniques for bi-directional sidelink beam failure detection in accordance with various aspects of the present disclosure.

FIG. 4 illustrates an example of a process flow diagram 400 that supports techniques for bi-directional sidelink beam failure detection in accordance with various aspects of the present disclosure. In some examples, process flow diagram 400 may implement aspects of wireless communications system 100. The process flow diagram 400 includes UE 470, UE 475, and base station 480, which may be examples of the corresponding devices as described with respect to FIGS. 1 through 3. The UE 470 and UE 475 may communicate over a sidelink communication channel.

At 405, the UE 475 may receive, from the base station 480, a control message that configures a first set of sidelink beam failure detection reference signals, a second set of sidelink beam failure detection reference signals, or both the second set of sidelink beam failure detection reference signals and the first set of sidelink beam failure detection reference signals. At 410, the UE 475 may transmit, to the UE 470, a sidelink control message that configures the second set of sidelink beam failure detection reference signals that the second UE 470 is to transmit to the first UE 475, the first set of sidelink beam failure detection reference signals that the second UE 470 is to receive from the first UE 475, or both the first set of sidelink beam failure detection reference signals and the second set of sidelink beam failure detection reference signals.

At 415, the UE 475 may determine a first set of sidelink beam failure detection reference signals to transmit to the second UE 470. At 420, the UE 475 may determine second set of sidelink beam failure detection reference signals to receive from the second UE 470. As illustrated, the UE 475 may determine the first and second set of beam failure detection reference signals based on the control message received from the base station. However, in some cases, the UE 475 may determine the first and second set of beam failure detection reference signals based on a reconfiguration, network conditions, or the like. In some cases, the UE 475 may receive a control message from the second UE 470 and the control message may configure the first and second set of beam failure detection reference signals.

At 425, the UE 470 may determine the first set of sidelink beam failure detection reference signals to receive from the first UE 475. At 430, the UE 470 may determine the second set of sidelink beam failure detection reference signals to transmit to the first UE 475. These determinations may be based on the control messages received from the base station 480.

At 435, the UE 475 may transmit the first set of sidelink beam failure detection reference signals to the second UE 470 using a set of sidelink transmit beams, and at 440, the UE 470 may monitor for the determined first set of sidelink beam failure detection reference signals using a set of sidelink receive beams.

At 445, the UE 470 may transmit the second set of sidelink beam failure detection reference signals to the first UE 475 and using a set of sidelink transmit beams, and at 450, the UE 475 may monitor for the determined second set of sidelink beam failure detection reference signals using a set of sidelink receive beams. As described herein, the first and second set of sidelink beam failure detection reference signals may include sidelink SSBs, sidelink CSI-RSs, or a combination thereof. In some cases, the first and second set may include different combinations of the sidelink SSBs and sidelink CSI-RSs. Further, the first and second set may be transmitted with different periodicities or transmission patterns.

At 455, the UE 475 may communicate with the second UE 470 on a sidelink based at least in part on the first set of sidelink beam failure detection reference signals and the second set of sidelink beam failure detection reference signals. In some cases, this may include determining a beam failure and initiating a beam failure recovery procedure.

Figure 5:
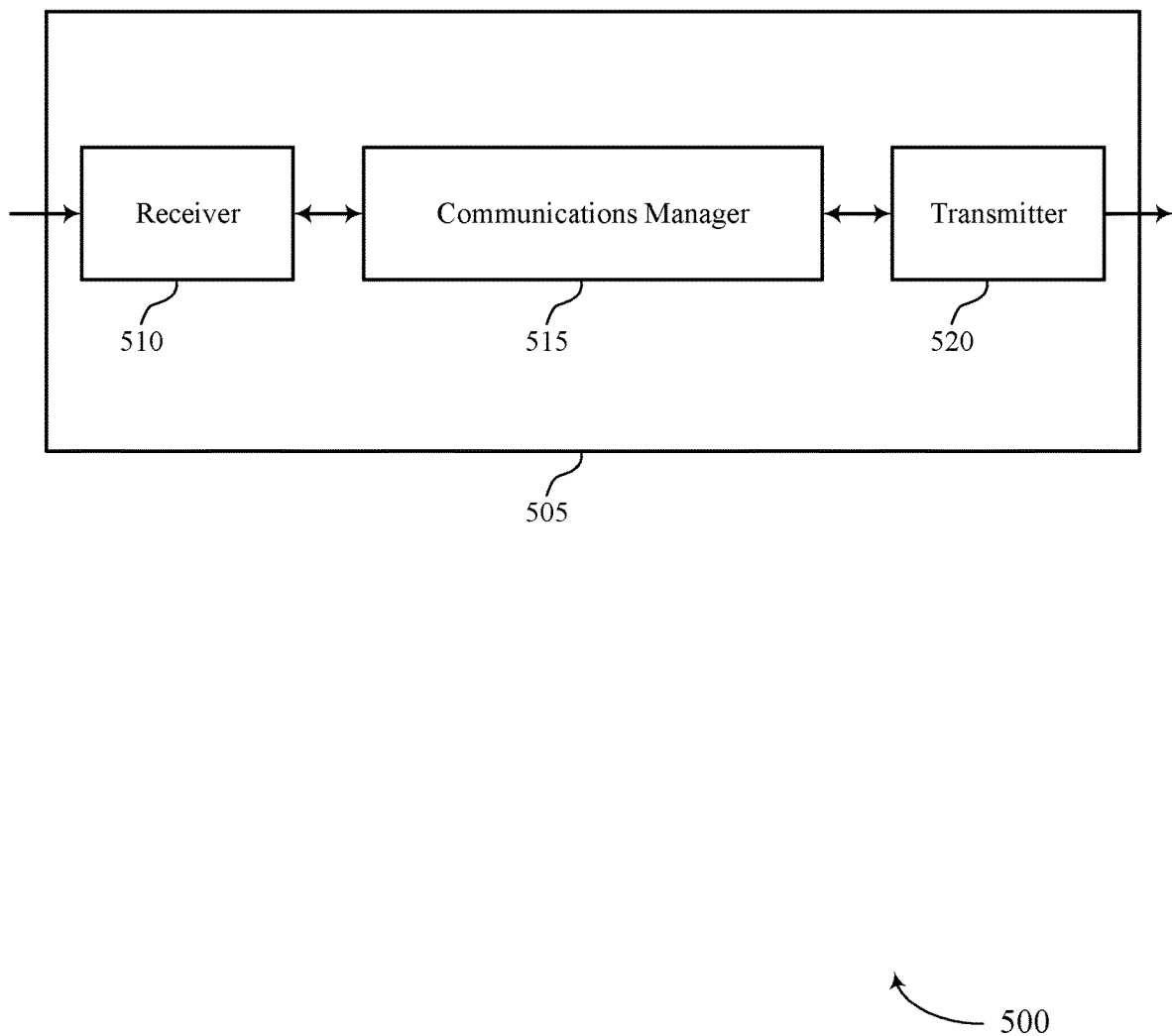
FIGS. 5 and 6 show block diagrams of devices that support techniques for bi-directional sidelink beam failure detection in accordance with various aspects of the present disclosure.

FIG. 5 shows a block diagram 500 of a device 505 that supports techniques for bi-directional sidelink beam failure detection in accordance with various aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for bi-directional sidelink beam failure detection, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine a first set of sidelink beam failure detection reference signals to transmit to a second UE, determine a second set of sidelink beam failure detection reference signals to receive from the second UE, transmit the first set of sidelink beam failure detection reference signals to the second UE using a set of sidelink transmit beams, monitor for the determined second set of sidelink beam failure detection reference signals using a set of sidelink receive beams, and communicate with the second UE on a sidelink based on the first set of sidelink beam failure detection reference signals and the second set of sidelink beam failure detection reference signals. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to more efficiently coordinate beam failure detection reference signals with another device 505, and more specifically determine the reference signals for determining beam failures for a sidelink with the second device. For example, the device 505 may identify a first set of sidelink beam failure detection reference signals to transmit to another device, identify a second set of sidelink beam failure detection reference signals to receive from the second UE, and transmit and receive the reference signals in accordance with the determining.

Based on implementing the sidelink beam failure detection techniques as described herein, a processor of a UE 115 (e.g., controlling the receiver 510, the transmitter 520, or the transceiver 820 as described with reference to FIG. 8) may increase reliability and decrease signaling overhead in the communication on a sidelink because beam failures may be more efficiently identified.

Figure 6:
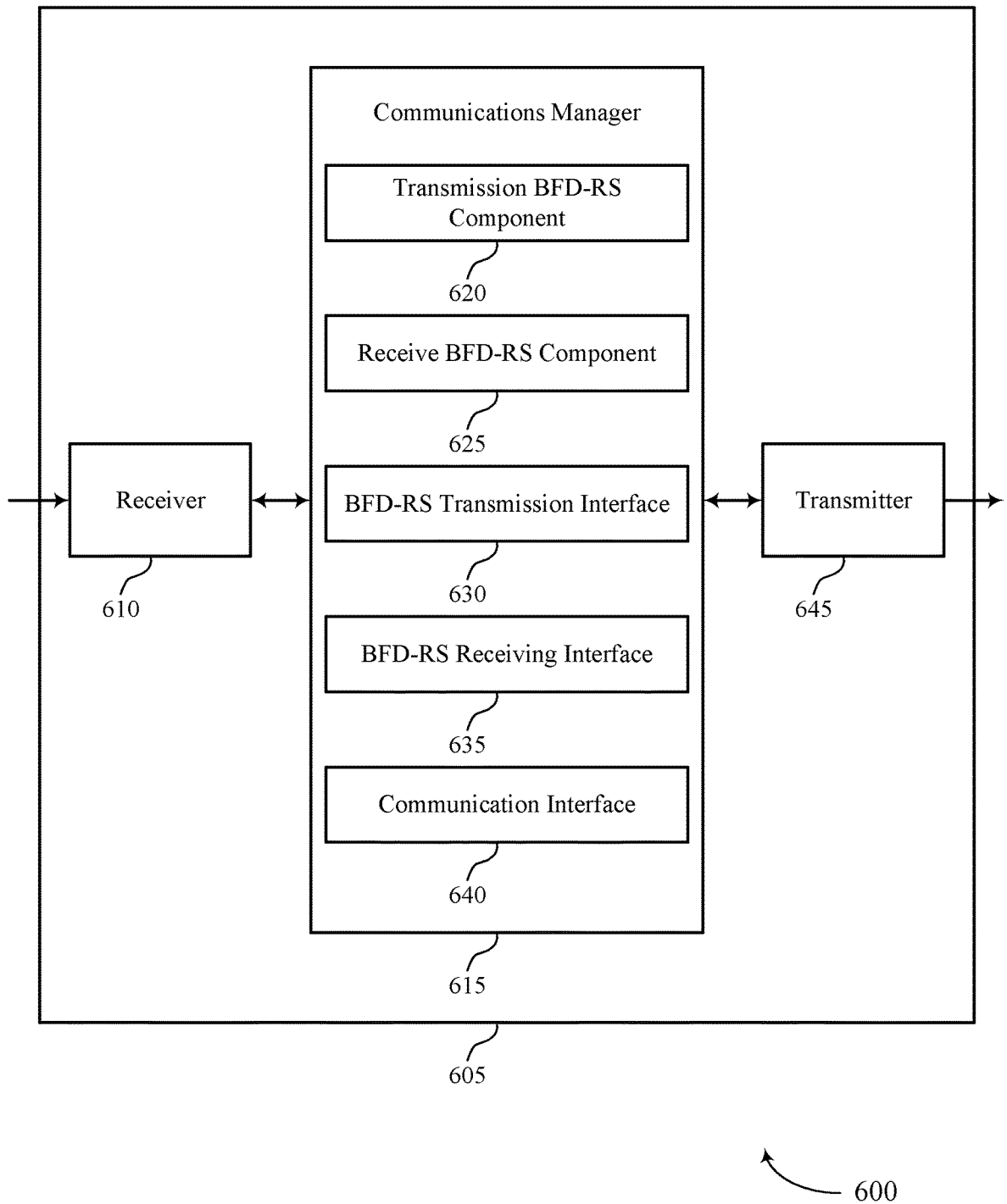

FIG. 6 shows a block diagram 600 of a device 605 that supports techniques for bi-directional sidelink beam failure detection in accordance with various aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to techniques for bi-directional sidelink beam failure detection, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a transmission BFD-RS component 620, a receive BFD-RS component 625, a BFD-RS transmission interface 630, a BFD-RS receiving interface 635, and a communication interface 640. The communications manager 615 may be an example of aspects of the communications manager 810 described herein.

The transmission BFD-RS component 620 may determine a first set of sidelink beam failure detection reference signals to transmit to a second UE.

The receive BFD-RS component 625 may determine a second set of sidelink beam failure detection reference signals to receive from the second UE.

The BFD-RS transmission interface 630 may transmit the first set of sidelink beam failure detection reference signals to the second UE using a set of sidelink transmit beams.

The BFD-RS receiving interface 635 may monitor for the determined second set of sidelink beam failure detection reference signals using a set of sidelink receive beams.

The communication interface 640 may communicate with the second UE on a sidelink based on the first set of sidelink beam failure detection reference signals and the second set of sidelink beam failure detection reference signals.

The transmitter 645 may transmit signals generated by other components of the device 605. In some examples, the transmitter 645 may be collocated with a receiver 610 in a transceiver component. For example, the transmitter 645 may be an example of aspects of the transceiver 820 described with reference to FIG. 8. The transmitter 645 may utilize a single antenna or a set of antennas.

Figure 7:
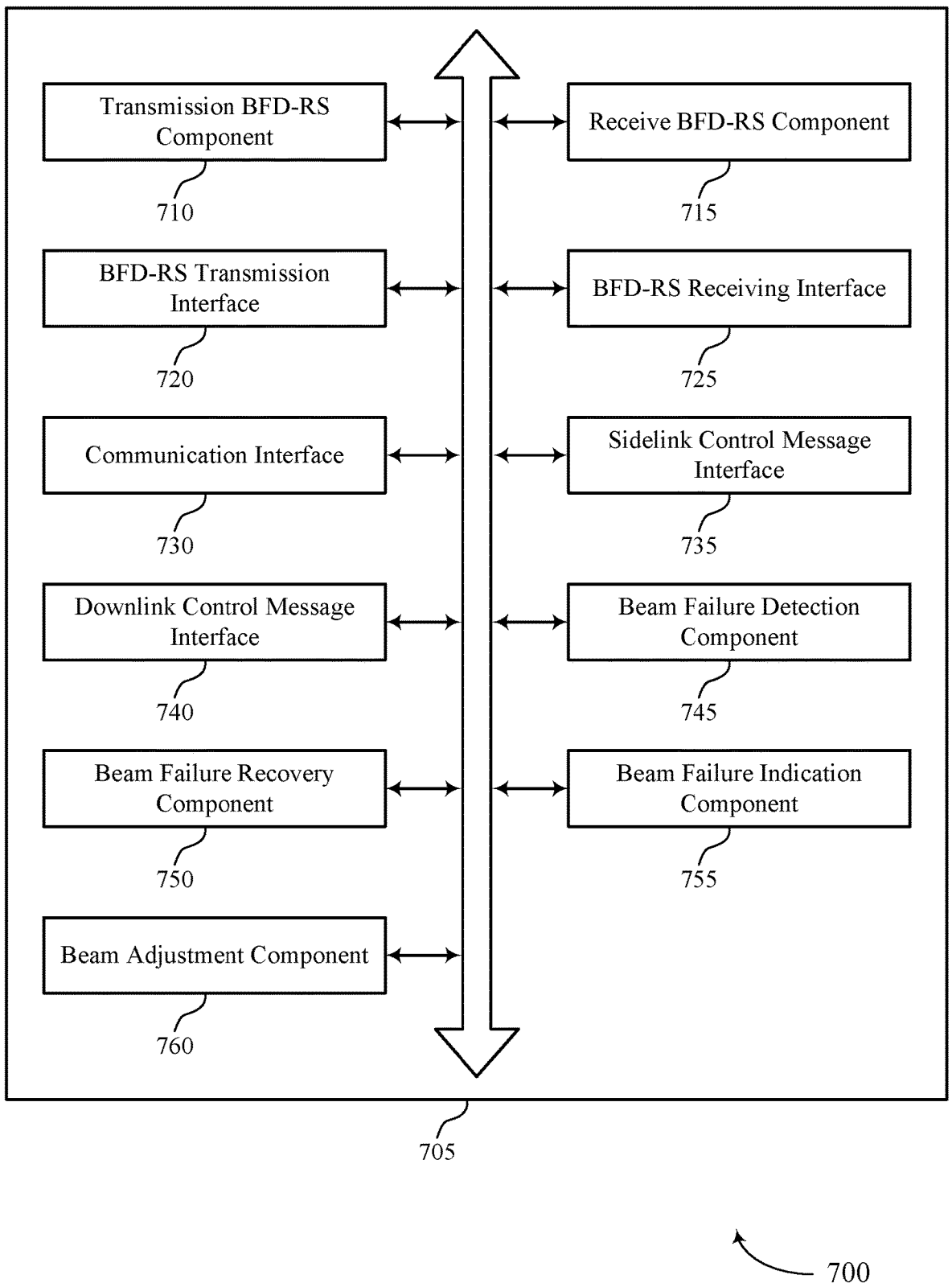
FIG. 7 shows a block diagram of a communications manager that supports techniques for bi-directional sidelink beam failure detection in accordance with various aspects of the present disclosure.

FIG. 7 shows a block diagram 700 of a communications manager 705 that supports techniques for bi-directional sidelink beam failure detection in accordance with various aspects of the present disclosure. The communications manager 705 may be an example of aspects of a communications manager 515, a communications manager 615, or a communications manager 810 described herein. The communications manager 705 may include a transmission BFD-RS component 710, a receive BFD-RS component 715, a BFD-RS transmission interface 720, a BFD-RS receiving interface 725, a communication interface 730, a sidelink control message interface 735, a downlink control message interface 740, a beam failure detection component 745, a beam failure recovery component 750, a beam failure indication component 755, and a beam adjustment component 760. Each of these components may communicate, directly or indirectly, with one another (e.g., via one or more buses).

The transmission BFD-RS component 710 may determine a first set of sidelink beam failure detection reference signals to transmit to a second UE.

The receive BFD-RS component 715 may determine a second set of sidelink beam failure detection reference signals to receive from the second UE.

The BFD-RS transmission interface 720 may transmit the first set of sidelink beam failure detection reference signals to the second UE using a set of sidelink transmit beams.

In some examples, the BFD-RS transmission interface 720 may refrain from transmitting one or more of the first set of sidelink beam failure detection reference signals based on detecting the beam failure, where the beam failure recovery procedure is performed with the second UE based on the refraining from transmitting the one or more of first set of sidelink beam failure detection reference signals.

In some cases, a first periodicity associated with transmitting the first set of sidelink beam failure detection reference signals is different from a second periodicity for monitoring for receipt of the second set of sidelink beam failure detection reference signals.

The BFD-RS receiving interface 725 may monitor for the determined second set of sidelink beam failure detection reference signals using a set of sidelink receive beams.

The communication interface 730 may communicate with the second UE on a sidelink based on the first set of sidelink beam failure detection reference signals and the second set of sidelink beam failure detection reference signals.

The sidelink control message interface 735 may receive, from the second UE, a control message that configures the first set of sidelink beam failure detection reference signals, the second set of sidelink beam failure detection reference signals or both the first set of sidelink beam failure detection reference signals and the second set of sidelink beam failure detection reference signals.

In some examples, the sidelink control message interface 735 may transmit, to the second UE, a first control message that configures the second set of sidelink beam failure detection reference signals that the second UE is to transmit to the first UE, the first set of sidelink beam failure detection reference signals that the second UE is to receive from the first UE, or both the second set of sidelink beam failure detection reference signals and the first set of sidelink beam failure detection reference signals.

In some examples, the sidelink control message interface 735 may receive, from the second UE, a control message that indicates a counter threshold value for a beam failure indication counter, an expiration timer value for a beam failure indication timer, or both the counter threshold value for the beam failure indication timer and the expiration timer value for the beam failure indication timer.

In some examples, the sidelink control message interface 735 may transmit, to the second UE, a control message that indicates a counter threshold value for a beam failure indication counter, an expiration timer value for a beam failure indication timer, or both the counter threshold value for the beam failure indication timer and the expiration timer value for the beam failure indication timer.

The downlink control message interface 740 may receive, from a base station, a second control message that configures the first set of sidelink beam failure detection reference signals, the second set of sidelink beam failure detection reference signals, or both the second set of sidelink beam failure detection reference signals and the first set of sidelink beam failure detection reference signals, where the first control message is transmitted to the second UE based on receiving the second control message from the base station.

In some examples, the downlink control message interface 740 may receive, from a base station, a control message that configures the first set of sidelink beam failure detection reference signals, the second set of sidelink beam failure detection reference signals, or both the first set of sidelink beam failure detection reference signals and the second set of sidelink beam failure detection reference signals.

In some examples, the downlink control message interface 740 may receive, from a base station, a control message that indicates a counter threshold value for a beam failure indication counter, an expiration timer value for a beam failure indication timer, or both the counter threshold value for the beam failure indication timer and the expiration timer value for the beam failure indication timer.

In some cases, the first set of sidelink beam failure detection reference signals, the second set of sidelink beam failure detection reference signals, or both the first set of sidelink beam failure detection reference signals and the second set of sidelink beam failure detection reference signals include a sidelink synchronization signal block or a sidelink channel state information reference signal.

The beam failure detection component 745 may detect a beam failure based on the monitoring for receipt of the second set of sidelink beam failure detection reference signals.

In some examples, the beam failure detection component 745 may determine that a reference signal received power of one or more of the second set of sidelink beam failure detection reference signals is below a received power threshold.

In some examples, the beam failure detection component 745 may initiate a beam failure timer based on determining that the reference signal received power is below the received power threshold.

In some examples, the beam failure detection component 745 may increment a beam failure counter for each occurrence of the second set of sidelink beam failure detection reference signals being received with the reference signal received power below the received power threshold before expiration of the beam failure timer, where the beam failure is detected based on the beam failure counter reaching a counter threshold. In some examples, the beam failure timer expires based on an expiration time value for a beam failure indication timer. In some examples, the counter threshold is a counter threshold value for the beam failure indication counter.

In some examples, the beam failure detection component 745 may increment a beam failure counter based on receiving the indication of the beam failure, where the beam failure recovery procedure is performed based on the beam failure counter reaching a counter threshold.

The beam failure recovery component 750 may perform a beam failure recovery procedure with the second UE based on detecting the beam failure.

In some examples, the beam failure recovery component 750 may perform a beam failure recovery procedure with the second UE based on receiving the indication.

The beam failure indication component 755 may transmit, to the second UE, a base station, or both the second UE and the base station, an indication of the beam failure, where the beam failure recovery procedure is performed based on transmitting the indication.

In some examples, the beam failure indication component 755 may receive, from the second UE or a base station, an indication of a beam failure associated with the second UE.

The beam adjustment component 760 may adjust one or more sidelink receive beams for receiving the second set of sidelink beam failure detection reference signals.

In some examples, the beam adjustment component 760 may transmit, to the second UE, an indication of adjustments to the one or more sidelink receive beams.

In some examples, the beam adjustment component 760 may receive, from the second UE, an indication of adjustments to one or more sidelink receive beams used by the second UE to receive the first set of sidelink beam failure detection reference signals.

Figure 8:
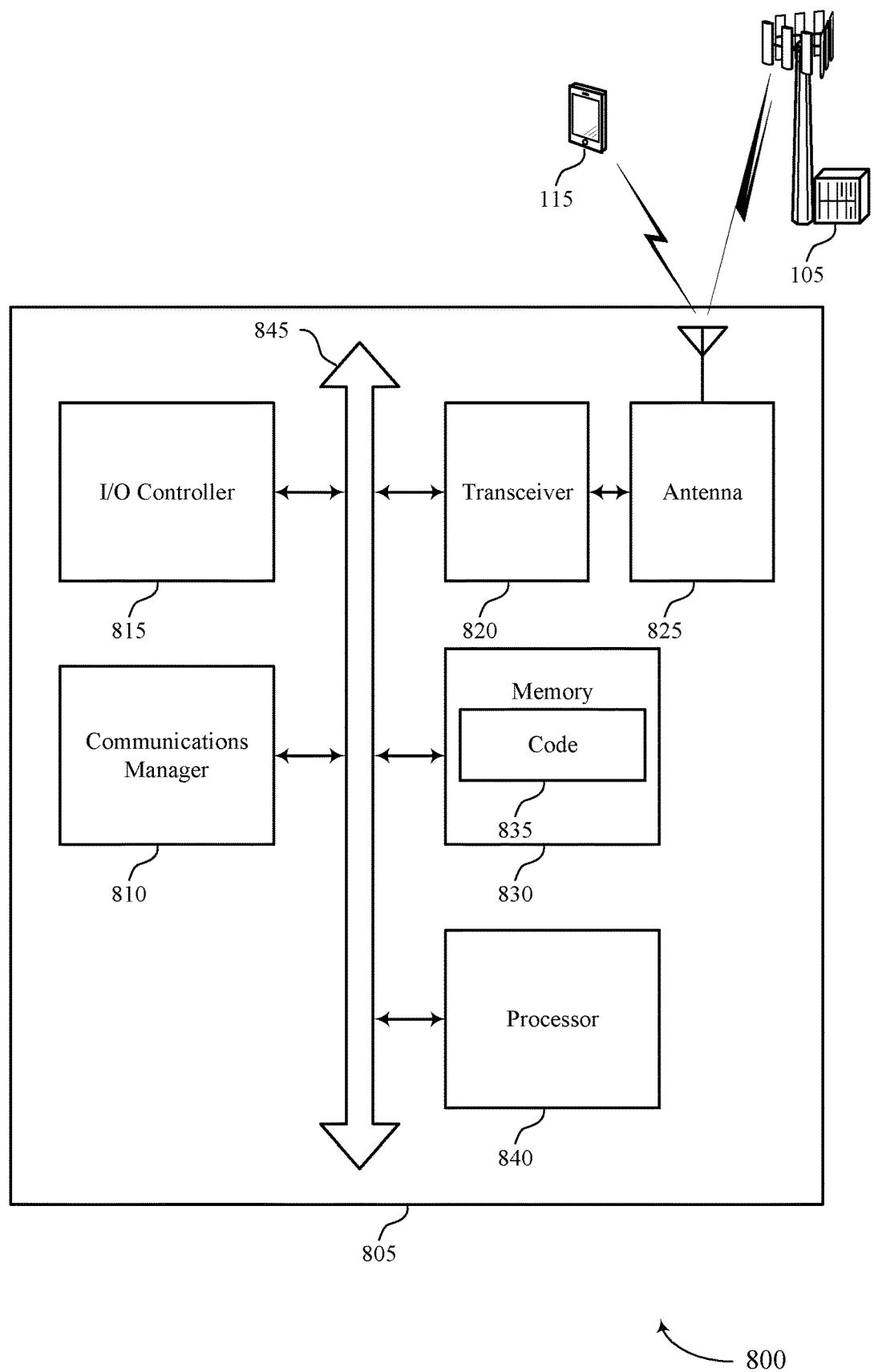
FIG. 8 shows a diagram of a system including a device that supports techniques for bi-directional sidelink beam failure detection in accordance with various aspects of the present disclosure.

FIG. 8 shows a diagram of a system 800 including a device 805 that supports techniques for bi-directional sidelink beam failure detection in accordance with various aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine a first set of sidelink beam failure detection reference signals to transmit to a second UE, determine a second set of sidelink beam failure detection reference signals to receive from the second UE, transmit the first set of sidelink beam failure detection reference signals to the second UE using a set of sidelink transmit beams, monitor for the determined second set of sidelink beam failure detection reference signals using a set of sidelink receive beams, and communicate with the second UE on a sidelink based on the first set of sidelink beam failure detection reference signals and the second set of sidelink beam failure detection reference signals.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for bi-directional sidelink beam failure detection).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
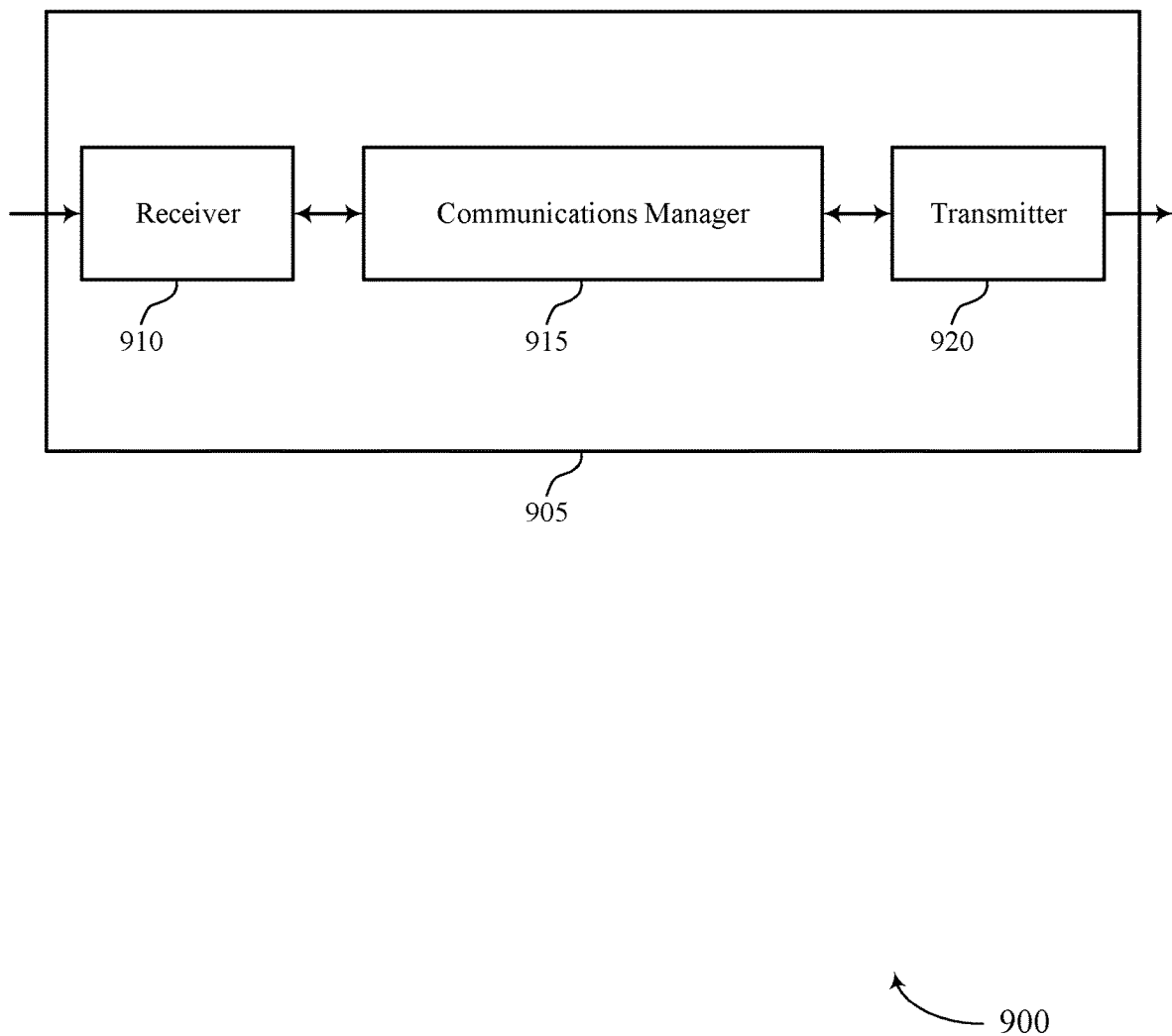
FIGS. 9 and 10 show block diagrams of devices that support techniques for bi-directional sidelink beam failure detection in accordance with various aspects of the present disclosure.

FIG. 9 shows a block diagram 900 of a device 905 that supports techniques for bi-directional sidelink beam failure detection in accordance with various aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for bi-directional sidelink beam failure detection, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a first UE, a control message that indicates a first set of sidelink beam failure detection reference signals to a second UE, a second set of sidelink beam failure detection reference signals to receive from the second UE, or both the first set of sidelink beam failure detection reference signals and the second set of sidelink beam failure detection reference signals and communicate with the first UE or the second UE based on transmitting the control message. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
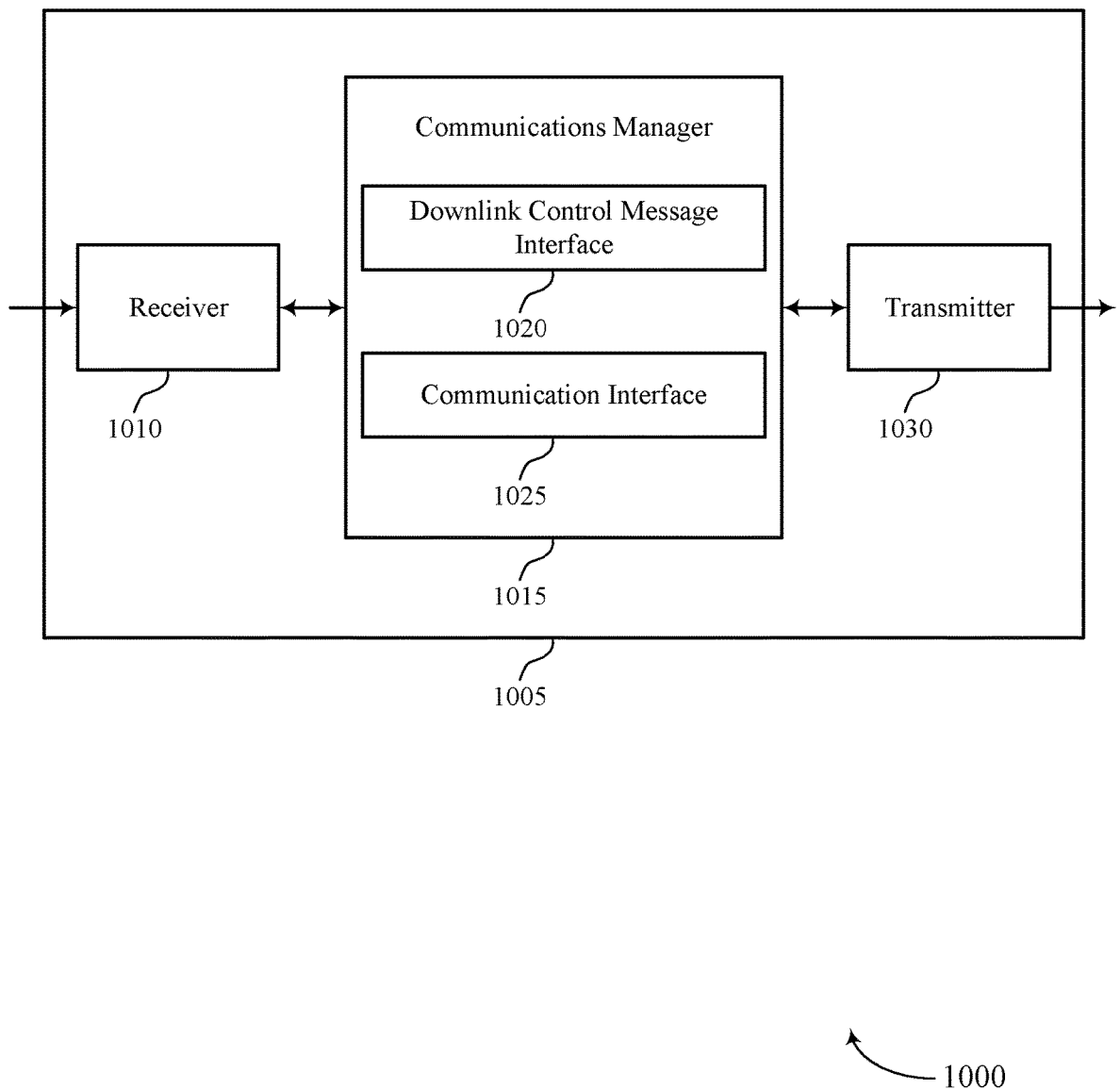

FIG. 10 shows a block diagram 1000 of a device 1005 that supports techniques for bi-directional sidelink beam failure detection in accordance with various aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for bi-directional sidelink beam failure detection, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a downlink control message interface 1020 and a communication interface 1025. The communications manager 1015 may be an example of aspects of the communications manager 1210 described herein.

The downlink control message interface 1020 may transmit, to a first UE, a control message that indicates a first set of sidelink beam failure detection reference signals to a second UE, a second set of sidelink beam failure detection reference signals to receive from the second UE, or both the first set of sidelink beam failure detection reference signals and the second set of sidelink beam failure detection reference signals.

The communication interface 1025 may communicate with the first UE or the second UE based on transmitting the control message.

The transmitter 1030 may transmit signals generated by other components of the device 1005. In some examples, the transmitter 1030 may be collocated with a receiver 1010 in a transceiver component. For example, the transmitter 1030 may be an example of aspects of the transceiver 1220 described with reference to FIG. 12. The transmitter 1030 may utilize a single antenna or a set of antennas.

Figure 11:
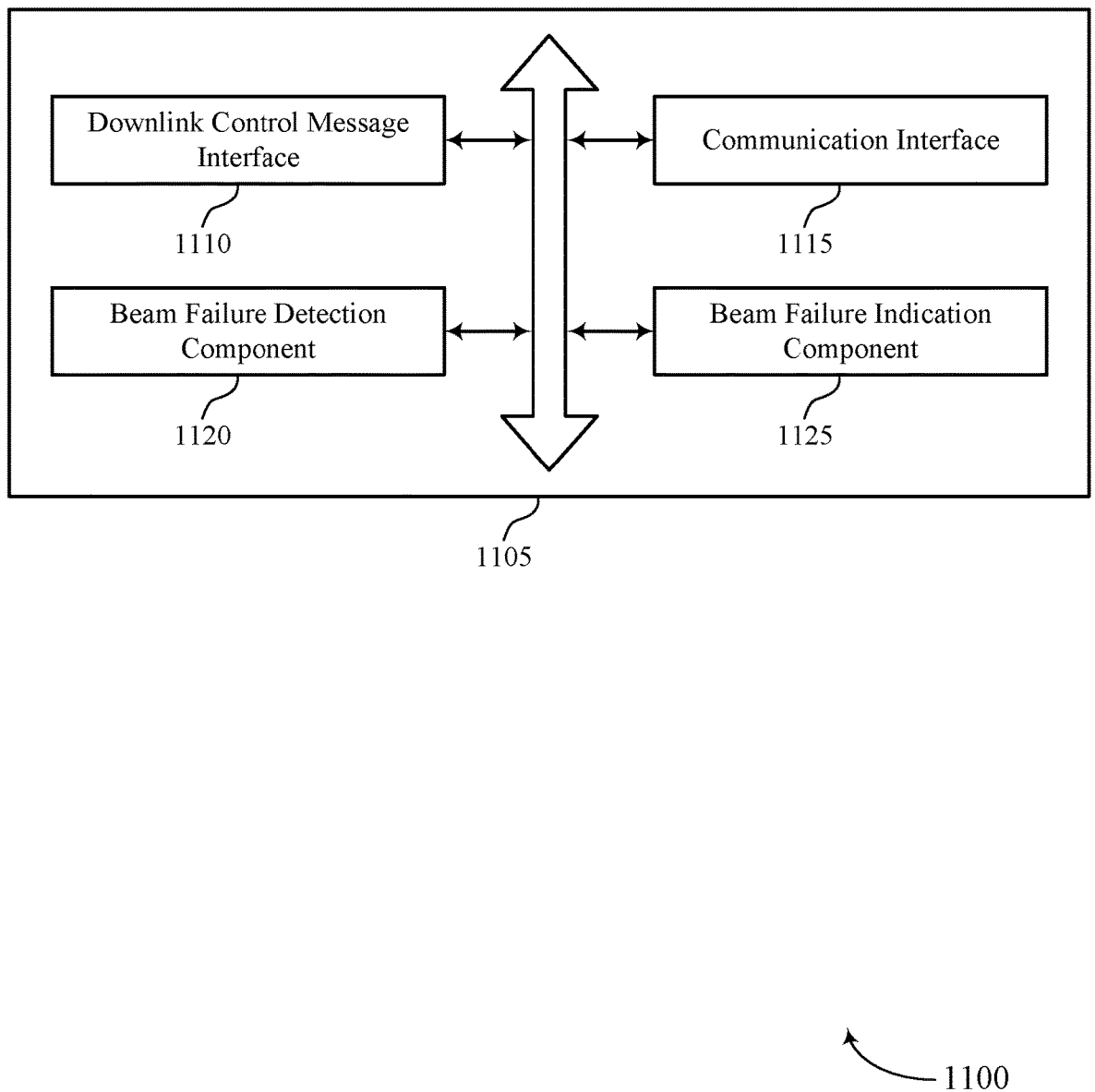
FIG. 11 shows a block diagram of a communications manager that supports techniques for bi-directional sidelink beam failure detection in accordance with various aspects of the present disclosure.

FIG. 11 shows a block diagram 1100 of a communications manager 1105 that supports techniques for bi-directional sidelink beam failure detection in accordance with various aspects of the present disclosure. The communications manager 1105 may be an example of aspects of a communications manager 915, a communications manager 1015, or a communications manager 1210 described herein. The communications manager 1105 may include a downlink control message interface 1110, a communication interface 1115, a beam failure detection component 1120, and a beam failure indication component 1125. Each of these components may communicate, directly or indirectly, with one another (e.g., via one or more buses).

The downlink control message interface 1110 may transmit, to a first UE, a control message that indicates a first set of sidelink beam failure detection reference signals to a second UE, a second set of sidelink beam failure detection reference signals to receive from the second UE, or both the first set of sidelink beam failure detection reference signals and the second set of sidelink beam failure detection reference signals.

In some examples, the downlink control message interface 1110 may transmit to the first UE, an indication that the first UE is to convey the first set of sidelink beam failure detection reference signals, the second set of sidelink beam failure detection reference signals, or both the first set of sidelink beam failure detection reference signals and the second set of sidelink beam failure detection reference signals to the second UE.

In some examples, the downlink control message interface 1110 may transmit, to the first UE, the control message that indicates a counter threshold value for a beam failure indication counter, an expiration timer value for a beam failure indication timer, or both the counter threshold value for the beam failure indication timer and the expiration timer value for the beam failure indication timer.

The communication interface 1115 may communicate with the first UE or the second UE based on transmitting the control message.

The beam failure detection component 1120 may receive, from the first UE, an indication of a beam failure associated with a sidelink between the first UE and the second UE.

The beam failure indication component 1125 may transmit, to the second UE, the indication of the beam failure.

Figure 12:
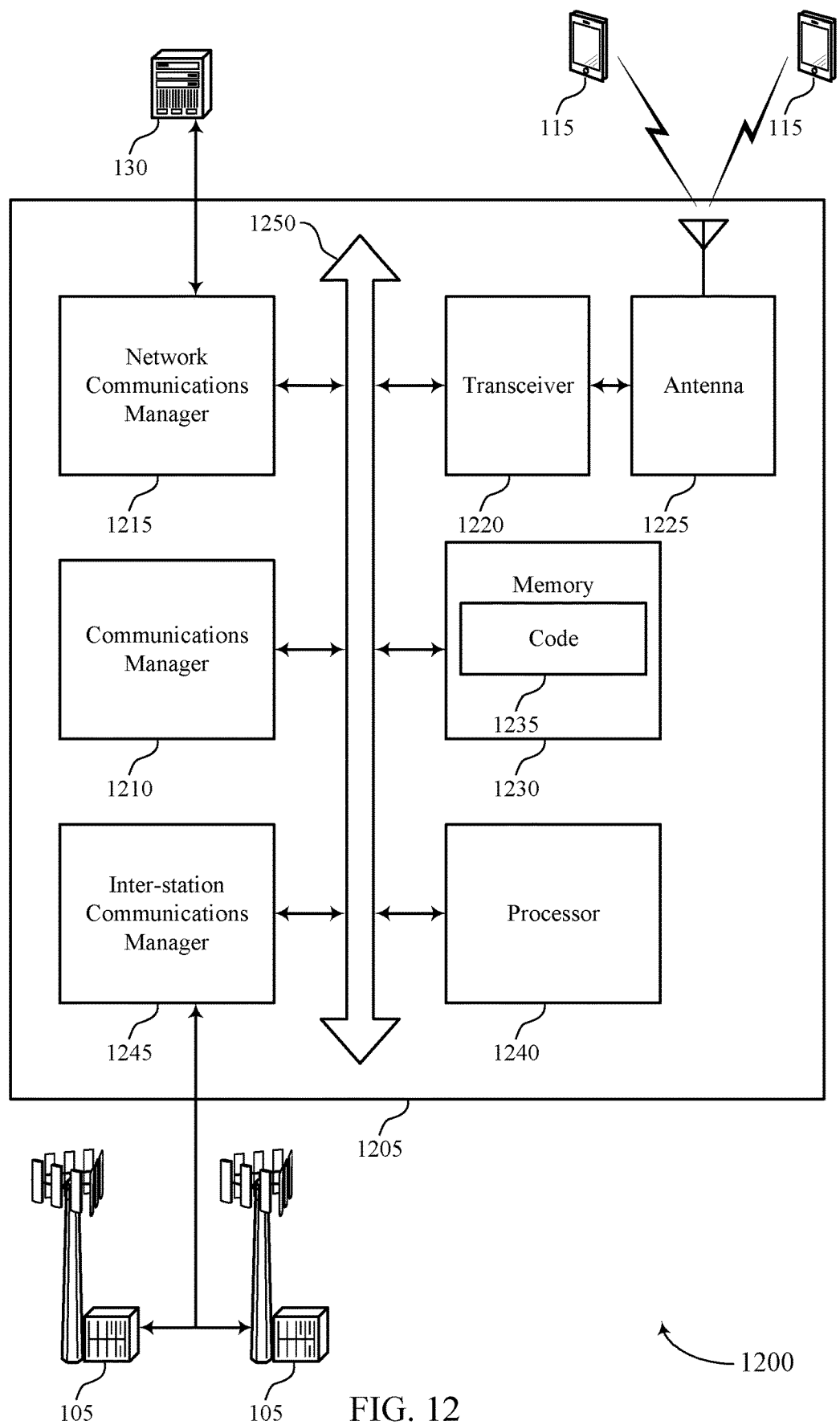
FIG. 12 shows a diagram of a system including a device that supports techniques for bi-directional sidelink beam failure detection in accordance with various aspects of the present disclosure.

FIG. 12 shows a diagram of a system 1200 including a device 1205 that supports techniques for bi-directional sidelink beam failure detection in accordance with various aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a first UE, a control message that indicates a first set of sidelink beam failure detection reference signals to a second UE, a second set of sidelink beam failure detection reference signals to receive from the second UE, or both the first set of sidelink beam failure detection reference signals and the second set of sidelink beam failure detection reference signals and communicate with the first UE or the second UE based on transmitting the control message.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for bi-directional sidelink beam failure detection).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
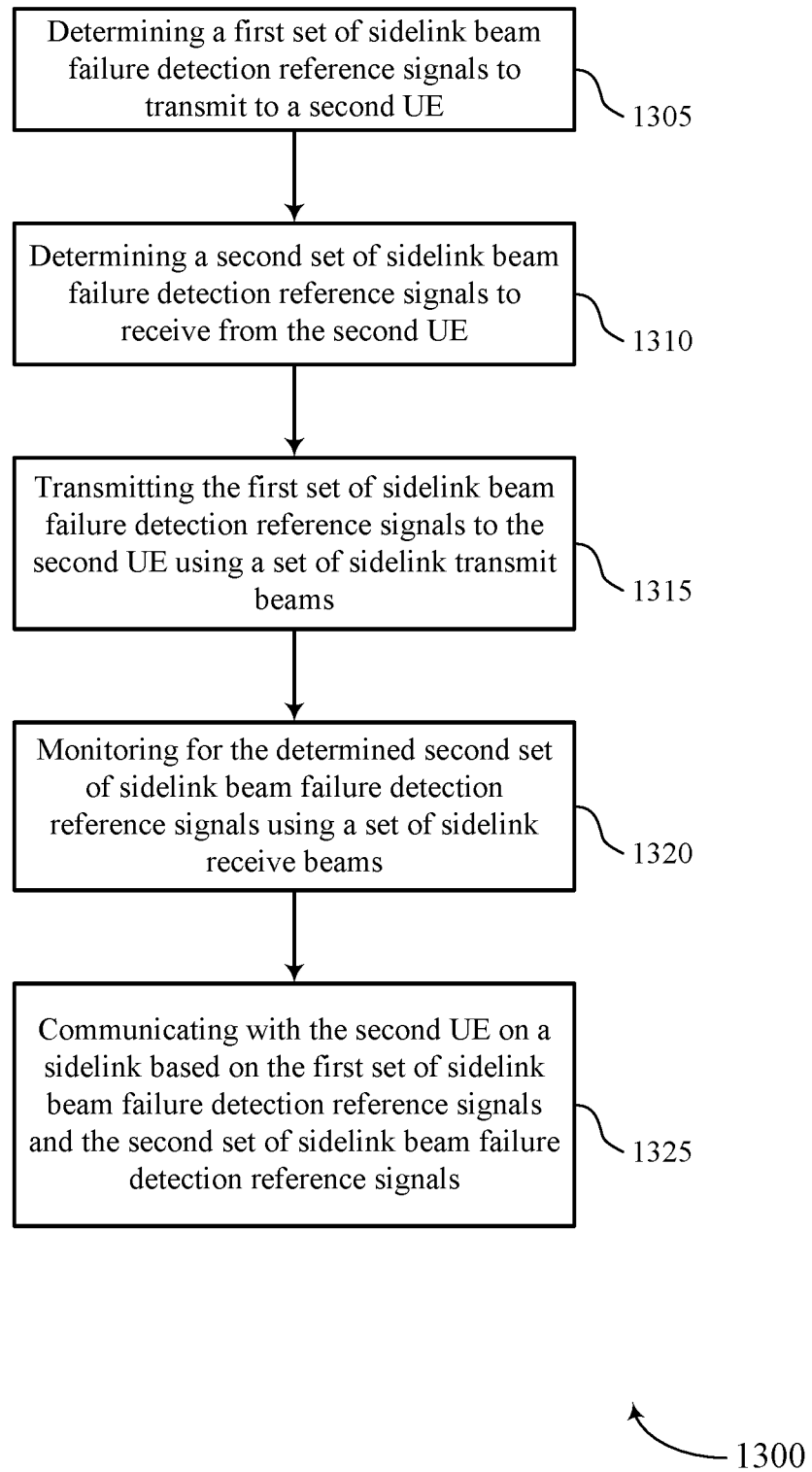
FIGS. 13 and 14 show flowcharts illustrating methods that support techniques for bi-directional sidelink beam failure detection in accordance with various aspects of the present disclosure.

FIG. 13 shows a flowchart illustrating a method 1300 that supports techniques for bi-directional sidelink beam failure detection in accordance with various aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, UE may transmit, to a second UE, a first set of sidelink beam failure detection reference signals using a set of sidelink transmit beams. The operations of 1315 may be performed according to the methods described herein. In some examples, aspects of the operations of 1315 may be performed by a BFD-RS transmission interface as described with reference to FIGS. 5 through 8.

At 1310, the UE may monitor for a second set of sidelink beam failure detection reference signals using a set of sidelink receive beams. The operations of 1320 may be performed according to the methods described herein. In some examples, aspects of the operations of 1320 may be performed by a BFD-RS receiving interface as described with reference to FIGS. 5 through 8.

At 1325, the UE may communicate with the second UE on a sidelink based on the first set of sidelink beam failure detection reference signals and the second set of sidelink beam failure detection reference signals. The operations of 1325 may be performed according to the methods described herein. In some examples, aspects of the operations of 1325 may be performed by a communication interface as described with reference to FIGS. 5 through 8.

Figure 14:
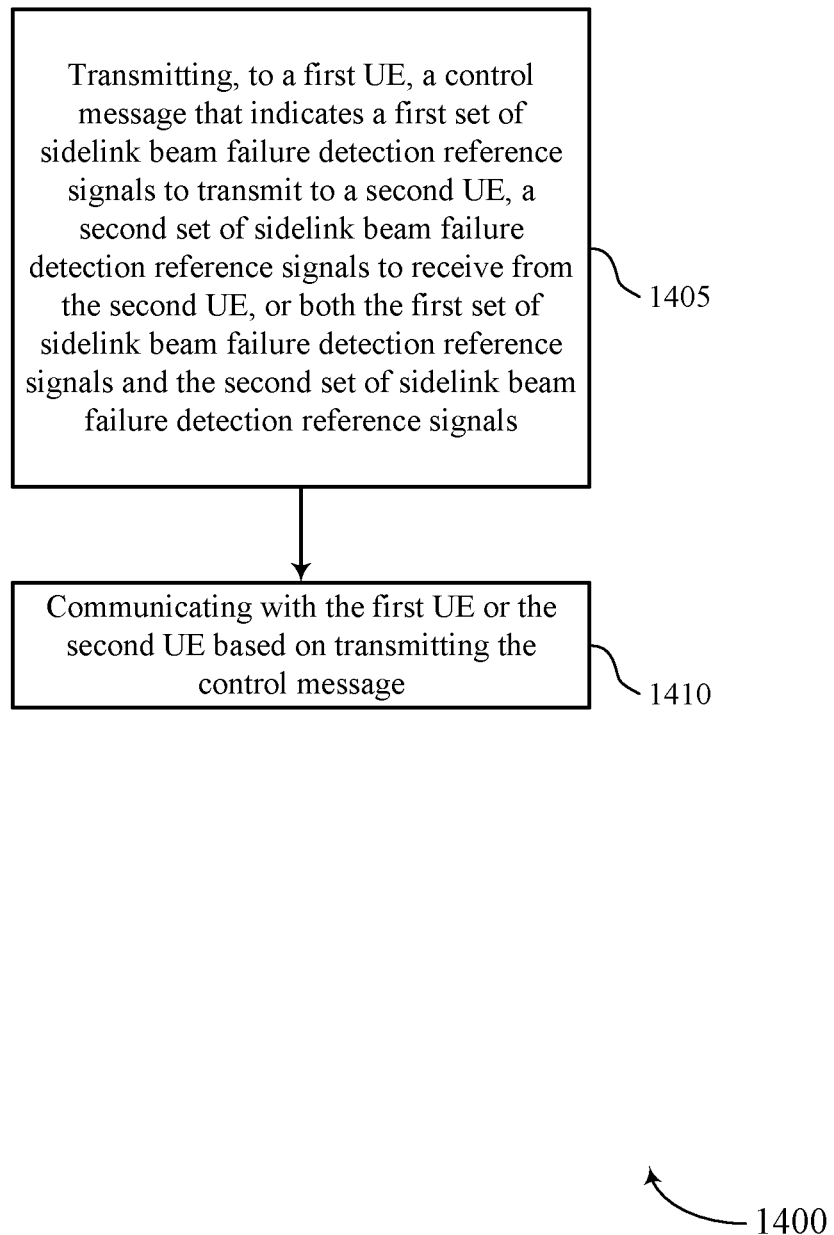

FIG. 14 shows a flowchart illustrating a method 1400 that supports techniques for bi-directional sidelink beam failure detection in accordance with various aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may transmit, to a first UE, a control message that indicates a first set of sidelink beam failure detection reference signals to a second UE, a second set of sidelink beam failure detection reference signals to receive from the second UE, or both the first set of sidelink beam failure detection reference signals and the second set of sidelink beam failure detection reference signals. The operations of 1405 may be performed according to the methods described herein. In some examples, aspects of the operations of 1405 may be performed by a downlink control message interface as described with reference to FIGS. 9 through 12.

At 1410, the base station may communicate with the first UE or the second UE based on transmitting the control message. The operations of 1410 may be performed according to the methods described herein. In some examples, aspects of the operations of 1410 may be performed by a communication interface as described with reference to FIGS. 9 through 12.

The following provides an overview of aspects of the present disclosure:

Aspect 1: A method for wireless communications at a first UE, comprising: transmitting, to a second UE, a first set of sidelink beam failure detection reference signals using a set of sidelink transmit beams; monitoring for a second set of sidelink beam failure detection reference signals using a set of sidelink receive beams; and communicating with the second UE on a sidelink based at least in part on the first set of sidelink beam failure detection reference signals and the second set of sidelink beam failure detection reference signals.

Aspect 2: The method of aspect 1, further comprising: receiving, from the second UE, a control message that configures the first set of sidelink beam failure detection reference signals, the second set of sidelink beam failure detection reference signals or both the first set of sidelink beam failure detection reference signals and the second set of sidelink beam failure detection reference signals.

Aspect 3: The method of aspect 1, further comprising: transmitting, to the second UE, a first control message that configures the second set of sidelink beam failure detection reference signals that the second UE is to transmit to the first UE, the first set of sidelink beam failure detection reference signals that the second UE is to receive from the first UE, or both the second set of sidelink beam failure detection reference signals and the first set of sidelink beam failure detection reference signals.

Aspect 4: The method of aspect 3, further comprising: receiving, from a base station, a second control message that configures the first set of sidelink beam failure detection reference signals, the second set of sidelink beam failure detection reference signals, or both the second set of sidelink beam failure detection reference signals and the first set of sidelink beam failure detection reference signals, wherein the first control message is transmitted to the second UE based at least in part on receiving the second control message from the base station.

Aspect 5: The method of any of aspects 2 through 4, further comprising: receiving, from a base station, a control message that configures the first set of sidelink beam failure detection reference signals, the second set of sidelink beam failure detection reference signals, or both the first set of sidelink beam failure detection reference signals and the second set of sidelink beam failure detection reference signals.

Aspect 6: The method of any of aspects 1 through 5, further comprising: receiving, from the second UE, a control message that indicates a counter threshold value for a beam failure indication counter, an expiration timer value for a beam failure indication timer, or both the counter threshold value for the beam failure indication timer and the expiration timer value for the beam failure indication timer.

Aspect 7: The method of any of aspects 1 through 5, further comprising: transmitting, to the second UE, a control message that indicates a counter threshold value for a beam failure indication counter, an expiration timer value for a beam failure indication timer, or both the counter threshold value for the beam failure indication timer and the expiration timer value for the beam failure indication timer.

Aspect 8: The method of any of aspects 1 through 5 and 7, further comprising: receiving, from a base station, a control message that indicates a counter threshold value for a beam failure indication counter, an expiration timer value for a beam failure indication timer, or both the counter threshold value for the beam failure indication timer and the expiration timer value for the beam failure indication timer.

Aspect 9: The method of any of aspects 1 through 8, further comprising: detecting a beam failure based at least in part on the monitoring for receipt of the second set of sidelink beam failure detection reference signals; and performing a beam failure recovery procedure with the second UE based at least in part on detecting the beam failure.

Aspect 10: The method of aspect 9, further comprising: refraining from transmitting one or more of the first set of sidelink beam failure detection reference signals based at least in part on detecting the beam failure, wherein the beam failure recovery procedure is performed with the second UE based at least in part on the refraining from transmitting the one or more of first set of sidelink beam failure detection reference signals.

Aspect 11: The method of any of aspects 9 through 10, further comprising: transmitting, to the second UE, a base station, or both the second UE and the base station, an indication of the beam failure, wherein the beam failure recovery procedure is performed based at least in part on transmitting the indication.

Aspect 12: The method of any of aspects 9 through 11, further comprising: determining that a reference signal received power of one or more of the second set of sidelink beam failure detection reference signals is below a received power threshold; initiating a beam failure timer based at least in part on determining that the reference signal received power is below the received power threshold; and incrementing a beam failure counter for each occurrence of the second set of sidelink beam failure detection reference signals being received with the reference signal received power below the received power threshold before expiration of the beam failure timer, wherein the beam failure is detected based at least in part on the beam failure counter reaching a counter threshold.

Aspect 13: The method of any of aspects 1 through 12, further comprising: receiving, from the second UE or a base station, an indication of a beam failure associated with the second UE; and performing a beam failure recovery procedure with the second UE based at least in part on receiving the indication.

Aspect 14: The method of aspect 13, further comprising: incrementing a beam failure counter based at least in part on receiving the indication of the beam failure, wherein the beam failure recovery procedure is performed based at least in part on the beam failure counter reaching a counter threshold.

Aspect 15: The method of any of aspects 1 through 14, further comprising: adjusting one or more sidelink receive beams for receiving the second set of sidelink beam failure detection reference signals.

Aspect 16: The method of aspect 15, further comprising: transmitting, to the second UE, an indication of adjustments to the one or more sidelink receive beams.

Aspect 17: The method of any of aspects 1 through 16, further comprising: receiving, from the second UE, an indication of adjustments to one or more sidelink receive beams used by the second UE to receive the first set of sidelink beam failure detection reference signals.

Aspect 18: The method of any of aspects 1 through 17, wherein the first set of sidelink beam failure detection reference signals, the second set of sidelink beam failure detection reference signals, or both the first set of sidelink beam failure detection reference signals and the second set of sidelink beam failure detection reference signals comprise a sidelink synchronization signal block or a sidelink channel state information reference signal.

Aspect 19: The method of any of aspects 1 through 18, wherein a first periodicity associated with transmitting the first set of sidelink beam failure detection reference signals is different from a second periodicity for monitoring for receipt of the second set of sidelink beam failure detection reference signals.

Aspect 20: A method for wireless communications at a base station, comprising: transmitting, to a first UE, a control message that indicates a first set of sidelink beam failure detection reference signals to transmit to a second UE, a second set of sidelink beam failure detection reference signals to receive from the second UE, or both the first set of sidelink beam failure detection reference signals and the second set of sidelink beam failure detection reference signals; and communicating with the first UE or the second UE based at least in part on transmitting the control message.

Aspect 21: The method of aspect 20, wherein transmitting the control message comprises: transmitting to the first UE, an indication that the first UE is to convey the first set of sidelink beam failure detection reference signals, the second set of sidelink beam failure detection reference signals, or both the first set of sidelink beam failure detection reference signals and the second set of sidelink beam failure detection reference signals to the second UE.

Aspect 22: The method of any of aspects 20 through 21, wherein transmitting the control message comprises: transmitting, to the first UE, the control message that indicates a counter threshold value for a beam failure indication counter, an expiration timer value for a beam failure indication timer, or both the counter threshold value for the beam failure indication timer and the expiration timer value for the beam failure indication timer.

Aspect 23: The method of any of aspects 20 through 22, further comprising: receiving, from the first UE, an indication of a beam failure associated with a sidelink between the first UE and the second UE; and transmitting, to the second UE, the indication of the beam failure.

Aspect 24: An apparatus for wireless communications at a first UE, comprising a processor; memory coupled with the processor; and instructions stored in the memory and executable by the processor to cause the apparatus to perform a method of any of aspects 1 through 19.

Aspect 25: An apparatus for wireless communications at a first UE, comprising at least one means for performing a method of any of aspects 1 through 19.

Aspect 26: A non-transitory computer-readable medium storing code for wireless communications at a first UE, the code comprising instructions executable by a processor to perform a method of any of aspects 1 through 19.

Aspect 27: An apparatus for wireless communications at a base station, comprising a processor; memory coupled with the processor; and instructions stored in the memory and executable by the processor to cause the apparatus to perform a method of any of aspects 20 through 23.

Aspect 28: An apparatus for wireless communications at a base station, comprising at least one means for performing a method of any of aspects 20 through 23.

Aspect 29: A non-transitory computer-readable medium storing code for wireless communications at a base station, the code comprising instructions executable by a processor to perform a method of any of aspects 20 through 23

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving from a second UE, a first control message comprising control information that configures a first set of sidelink beam failure detection reference signals that the first UE is to transmit to the second UE using a set of sidelink transmit beams and that configures a second set of sidelink beam failure detection reference signals that the first UE is to receive from the second UE using a set of sidelink receive beams, wherein the first set of sidelink beam failure detection reference signals, the second set of sidelink beam failure detection reference signals, or both the first set of sidelink beam failure detection reference signals and the second set of sidelink beam failure detection reference signals comprise respective sidelink synchronization signal blocks;
   transmitting, to the second UE, the first set of sidelink beam failure detection reference signals using the set of sidelink transmit beams;
   monitoring for the second set of sidelink beam failure detection reference signals using the set of sidelink receive beams, the second set of sidelink beam failure detection reference signals different from the first set of sidelink beam failure detection reference signals; and
   communicating with the second UE on a sidelink based at least in part on the first set of sidelink beam failure detection reference signals and the second set of sidelink beam failure detection reference signals.

2. The method of claim 1, wherein receiving the first control message comprises:
   receiving, from the second UE, the first control message that indicates a counter threshold value for a beam failure indication counter, an expiration timer value for a beam failure indication timer, or both the counter threshold value for the beam failure indication timer and the expiration timer value for the beam failure indication timer.

3. The method of claim 1, further comprising:
   transmitting, to the second UE, a second control message that indicates a counter threshold value for a beam failure indication counter, an expiration timer value for a beam failure indication timer, or both the counter threshold value for the beam failure indication timer and the expiration timer value for the beam failure indication timer.

4. The method of claim 1, further comprising:
   receiving, from a network entity, a second control message that indicates a counter threshold value for a beam failure indication counter, an expiration timer value for a beam failure indication timer, or both the counter threshold value for the beam failure indication timer and the expiration timer value for the beam failure indication timer.

5. The method of claim 1, further comprising:
   detecting a beam failure based at least in part on the monitoring for receipt of the second set of sidelink beam failure detection reference signals; and
   performing a beam failure recovery procedure with the second UE based at least in part on detecting the beam failure.

6. The method of claim 5, further comprising:
refraining from transmitting one or more of the first set of sidelink beam failure detection reference signals based at least in part on detecting the beam failure, wherein the beam failure recovery procedure is performed with the second UE based at least in part on the refraining from transmitting the one or more of the first set of sidelink beam failure detection reference signals.

7. The method of claim 5, further comprising:
transmitting, to the second UE, a network entity, or both the second UE and the network entity, an indication of the beam failure, wherein the beam failure recovery procedure is performed based at least in part on transmitting the indication.

8. The method of claim 5, further comprising:
determining that a reference signal received power of one or more of the second set of sidelink beam failure detection reference signals is below a received power threshold;
initiating a beam failure timer based at least in part on determining that the reference signal received power is below the received power threshold; and
incrementing a beam failure counter for each occurrence of the second set of sidelink beam failure detection reference signals being received with the reference signal received power below the received power threshold before expiration of the beam failure timer, wherein the beam failure is detected based at least in part on the beam failure counter reaching a counter threshold.

9. The method of claim 1, further comprising:
receiving, from the second UE or a network entity, an indication of a beam failure associated with the second UE; and
performing a beam failure recovery procedure with the second UE based at least in part on receiving the indication.

10. The method of claim 9, further comprising:
incrementing a beam failure counter based at least in part on receiving the indication of the beam failure, wherein the beam failure recovery procedure is performed based at least in part on the beam failure counter reaching a counter threshold.

11. The method of claim 1, further comprising:
adjusting one or more sidelink receive beams for receiving the second set of sidelink beam failure detection reference signals.

12. The method of claim 11, further comprising:
transmitting, to the second UE, an indication of adjustments to the one or more sidelink receive beams.

13. The method of claim 1, further comprising:
receiving, from the second UE, an indication of adjustments to one or more sidelink receive beams used by the second UE to receive the first set of sidelink beam failure detection reference signals.

14. The method of claim 1, wherein the first set of sidelink beam failure detection reference signals, the second set of sidelink beam failure detection reference signals, or both the first set of sidelink beam failure detection reference signals and the second set of sidelink beam failure detection reference signals additionally comprise sidelink channel state information reference signals.

15. The method of claim 1, wherein a first periodicity associated with transmitting the first set of sidelink beam failure detection reference signals is different from a second periodicity for monitoring for receipt of the second set of sidelink beam failure detection reference signals.

16. An apparatus for wireless communications at a first user equipment (UE), comprising:
one or more processors,
one or more memories coupled with the one or more processors; and
instructions stored in the one or more memories and executable by the one or more processors to cause the apparatus to:
receive, from a second UE, a first control message comprising control information that configures a first set of sidelink beam failure detection reference signals that the first UE is to transmit to the second UE using a set of sidelink transmit beams and that configures a second set of sidelink beam failure detection reference signals that the first UE is to receive from the second UE using a set of sidelink receive beams, wherein the first set of sidelink beam failure detection reference signals, the second set of sidelink beam failure detection reference signals, or both the first set of sidelink beam failure detection reference signals and the second set of sidelink beam failure detection reference signals comprise respective sidelink synchronization signal blocks;
transmit, to the second UE, the first set of sidelink beam failure detection reference signals using the set of sidelink transmit beams;
monitor for the second set of sidelink beam failure detection reference signals using the set of sidelink receive beams, the second set of sidelink beam failure detection reference signals different from the first set of sidelink beam failure detection reference signals; and
communicate with the second UE on a sidelink based at least in part on the first set of sidelink beam failure detection reference signals and the second set of sidelink beam failure detection reference signals.

17. The apparatus of claim 16, wherein the instructions to receive the first control message are further executable by the one or more processors to cause the apparatus to:
receive, from the second UE, the first control message that indicates a counter threshold value for a beam failure indication counter, an expiration timer value for a beam failure indication timer, or both the counter threshold value for the beam failure indication timer and the expiration timer value for the beam failure indication timer.

18. The apparatus of claim 16, wherein the instructions are further executable by the one or more processors to cause the apparatus to:
transmit, to the second UE, a second control message that indicates a counter threshold value for a beam failure indication counter, an expiration timer value for a beam failure indication timer, or both the counter threshold value for the beam failure indication timer and the expiration timer value for the beam failure indication timer.

19. The apparatus of claim 16, wherein the instructions are further executable by the one or more processors to cause the apparatus to:
receive, from a network entity, a second control message that indicates a counter threshold value for a beam failure indication counter, an expiration timer value for a beam failure indication timer, or both the counter threshold value for the beam failure indication timer and the expiration timer value for the beam failure indication timer.

20. The apparatus of claim 16, wherein the instructions are further executable by the one or more processors to cause the apparatus to:
  detect a beam failure based at least in part on the monitoring for receipt of the second set of sidelink beam failure detection reference signals; and
  perform a beam failure recovery procedure with the second UE based at least in part on detecting the beam failure.

21. An apparatus for wireless communications at a first user equipment (UE), comprising:
  means for receiving from a second UE, a control message comprising control information that configures a first set of sidelink beam failure detection reference signals that the first UE is to transmit to the second UE using a set of sidelink transmit beams and that configures a second set of sidelink beam failure detection reference signals that the first UE is to receive from the second UE using a set of sidelink receive beams, wherein the first set of sidelink beam failure detection reference signals, the second set of sidelink beam failure detection reference signals, or both the first set of sidelink beam failure detection reference signals and the second set of sidelink beam failure detection reference signals comprise respective sidelink synchronization signal blocks;
  means for transmitting, to the second UE, the first set of sidelink beam failure detection reference signals using the set of sidelink transmit beams;
  means for monitoring for the second set of sidelink beam failure detection reference signals using the set of sidelink receive beams, the second set of sidelink beam failure detection reference signals different from the first set of sidelink beam failure detection reference signals; and
  means for communicating with the second UE on a sidelink based at least in part on the first set of sidelink beam failure detection reference signals and the second set of sidelink beam failure detection reference signals.

22. A non-transitory computer-readable medium storing code for wireless communications at a first user equipment (UE), the code comprising instructions executable by one or more processors to:
  receive, from a second UE, a control message comprising control information that configures a first set of sidelink beam failure detection reference signals that the first UE is to transmit to the second UE using a set of sidelink transmit beams and that configures a second set of sidelink beam failure detection reference signals that the first UE is to receive from the second UE using a set of sidelink receive beams, wherein the first set of sidelink beam failure detection reference signals, the second set of sidelink beam failure detection reference signals, or both the first set of sidelink beam failure detection reference signals and the second set of sidelink beam failure detection reference signals comprise respective sidelink synchronization signal blocks;
  transmit, to the second UE, the first set of sidelink beam failure detection reference signals using the set of sidelink transmit beams;
  monitor for the second set of sidelink beam failure detection reference signals using the set of sidelink receive beams, the second set of sidelink beam failure detection reference signals different from the first set of sidelink beam failure detection reference signals; and
  communicate with the second UE on a sidelink based at least in part on the first set of sidelink beam failure detection reference signals and the second set of sidelink beam failure detection reference signals.

* * * * *